(12) United States Patent
Sheynman et al.

(10) Patent No.: US 7,970,350 B2
(45) Date of Patent: Jun. 28, 2011

(54) DEVICES AND METHODS FOR CONTENT SHARING

(75) Inventors: Arnold Sheynman, Northbrook, IL (US); Daniel R. Muehl, Poplar Grove, IL (US); Yingchun Ran, Winchester, MA (US); Jun Tian, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 677 days.

(21) Appl. No.: 11/930,310

(22) Filed: Oct. 31, 2007

(65) Prior Publication Data

US 2009/0111378 A1    Apr. 30, 2009

(51) Int. Cl.
*H04B 5/00*    (2006.01)
(52) U.S. Cl. .......... 455/41.1; 455/41.2; 455/414.1; 455/432.2; 709/246; 370/259
(58) Field of Classification Search .......... 455/41.1, 455/41.2, 414.1, 432.2, 466, 411, 433, 436; 709/246; 370/259, 260, 328
See application file for complete search history.

(56) References Cited

U.S. PATENT DOCUMENTS

| | | |
|---|---|---|
| 6,351,653 B1 | 2/2002 | Alberth, Jr. et al. |
| 6,405,027 B1 | 6/2002 | Bell |
| 7,469,151 B2 * | 12/2008 | Khan et al. ............ 455/558 |
| 7,471,200 B2 * | 12/2008 | Otranen ............ 340/572.1 |

(Continued)

FOREIGN PATENT DOCUMENTS

EP    1705936 A    9/2006

(Continued)

OTHER PUBLICATIONS

"Near Field Communication Interface and Protocol (NFCIP-1)", ECMA-340 Standard 2nd Edition, Dec. 2004.

(Continued)

*Primary Examiner* — Minh D Dao
(74) *Attorney, Agent, or Firm* — Paula N. Chavez; Sylvia Chen

(57) ABSTRACT

Described are methods and devices for automatically coupling two or more mobile communication devices (502, 541) to share content such as calls, music, documents, video and games where two or more devices automatically determine the feasibility of sharing the content and negotiate to find an efficient manner in which to do so. In this way, the pairing between devices may be transparent to the users. Moreover, a better choice in a transport may be selected without user input. Each device may include a near field communication (NFC) device that when in range of the other device may automatically initiate pairing between the devices so that the devices may share content. The users of NFC enabled devices may have little or minimal interactions except that one or more users may bring the devices within range so that the NFCs may initiate the pairing between the devices.

20 Claims, 14 Drawing Sheets

U.S. PATENT DOCUMENTS

| | | | |
|---|---|---|---|
| 2002/0023215 A1* | 2/2002 | Wang et al. | 713/171 |
| 2003/0224808 A1 | 12/2003 | Bonta | |
| 2005/0003822 A1 | 1/2005 | Aholainen et al. | |
| 2005/0198029 A1 | 9/2005 | Pohja et al. | |
| 2005/0202857 A1 | 9/2005 | Seshadri et al. | |
| 2005/0242925 A1 | 11/2005 | Zaretsky et al. | |
| 2005/0271194 A1 | 12/2005 | Woods et al. | |
| 2006/0183462 A1* | 8/2006 | Kolehmainen | 455/411 |
| 2007/0054616 A1 | 3/2007 | Culbert | |
| 2007/0073929 A1* | 3/2007 | Takayama et al. | 710/51 |
| 2007/0229264 A1* | 10/2007 | Eveland | 340/572.1 |
| 2008/0049372 A1* | 2/2008 | Loke | 361/143 |
| 2008/0116847 A1* | 5/2008 | Loke et al. | 320/108 |
| 2008/0162088 A1* | 7/2008 | DeVaul et al. | 702/190 |
| 2008/0207172 A1* | 8/2008 | Eguchi et al. | 455/411 |
| 2008/0279129 A1* | 11/2008 | Zhodzishsky et al. | 370/311 |
| 2009/0157799 A1* | 6/2009 | Sukumaran et al. | 709/203 |
| 2009/0222659 A1* | 9/2009 | Miyabayashi et al. | 713/156 |
| 2009/0298577 A1* | 12/2009 | Gagner et al. | 463/25 |

FOREIGN PATENT DOCUMENTS

| | | |
|---|---|---|
| WO | 2004003801 A | 1/2004 |
| WO | 2004/051958 A2 | 6/2004 |
| WO | 2005060127 A | 6/2005 |

OTHER PUBLICATIONS

Anind K. Dey, "Understanding and Using Context", Personal and Ubiquitous Computing, 2001.

"Bluetooth Configuration RTD", NFC Forum X.X Revision 0.12, Draft version, Submission of Technology, Oct. 14, 2005.

"Whitepaper on NFC Forum specifications for Wi-Fi Simple Configuration", NFC Forum 2005 Revision 0.9, May 7, 2005.

"Main Configuration RTD", NFC Forum X.X Revision 0.9e, Draft version, Submission of Technology, Oct. 13, 2005.

NFC Forum, "NFC Data Exchange Format (NDEF) Technical Specification" (NFCForum-TS-NDEF_1.0), Jul. 24, 2006, pp. 1-69, Wakefield, MA, USA.

* cited by examiner n = 3, m = 2 EXAMPLE OF THE P2PSM

| BYTE | CONTENT | DESCRIPTION |
|---|---|---|
| 0 | 0X02 | RECORD TYPE LENGTH |
| 1 - 2 | "BT" | RECORD TYPE "BT" |
| 3 | 0X26 | THE RECORD LENGTH IS 38 BYTES |
| 4 | 0X02 | BT CONFIGURATION TYPE. 0X02 MEANS A PUBLIC KEY IS USED FOR BT AUTHENTICATION |
| 5 - 10 | 0X010203040506 | BLUETOOTH DEVICE ADDRESS OF THE SENDING DEVICE |
| 11 - 13 | 0X500305 | CLASS OF DEVICE FIELD 0X500305 MEANS THIS IS A CELL PHONE |
| 14 - 29 | 0X00112233445566778899AABBCCDDEEFF | 16 BYTE PUBLIC KEY FOR BT AUTHENTICATION |
| 30 | 0X0B | MEANS THE SHORT NAME LENGTH IS 11 BYTES |
| 31 - 41 | "T2S PHONE_1" | THE DEVICE SHORT NAME IS "T2S PHONE_1" |

*FIG. 14*

| BYTE | CONTENT | DESCRIPTION |
|---|---|---|
| 0 | 0X03 | RECORD TYPE LENGTH |
| 1 - 3 | "WLA" | RECORD TYPE "WLA" |
| 4 | 0X3A | THE RECORD LENGTH IS 58 BYTES |
| 5 - 11 | 0X03 "WLF" 0X02 "BG" | MEANS THE SUPPORTED WLAN FLAVOURS ARE 802.11B AND 802.11G. WHERE 0X03 INDICATES THAT THE LENGTH OF THE SUB-RECORD TYPE "WLF" IS 3 BYTES, 0X02 INDICATES THAT THE LENGTH OF THE SUB-RECORD "BG" IS 2 BYTES |
| 12 - 24 | 0X03 "SSI" 0X08 "T2S_WLAN" | MEANS THE SSID IS "T2S_WLAN", WHERE 0X03 INDICATES THAT THE LENGTH OF THE SUB-RECORD TYPE "SSI" IS 3 BYTES, 0X08 INDICATES THAT THE LENGTH OF THE SUB-RECORD IS 8 BYTES AND SSID IS "T2S_WLAN" |
| 25 - 31 | 0X03 "MCH" 0X02 "A" 0X00 | MEANS THE CONNECTION MODE IS AD-HOC("A" MEANS AD-HOC, "I" MEANS INFRASTRUCTURE MODE) AND THE CHANNEL IS AUTOMATIC SELECTED (0X00 INDICATES "AUTO". IF SET AS 1, IT MEANS CHANNEL 1 IS SELECTED). WHERE 0X03 INDICATES THAT THE LENGTH OF THE SUB-RECORD TYPE "MCH" IS 3 BYTES, "MCH" STANDS FOR CONNECTION MODE AND CHANNEL |
| 32 - 37 | 0X03 "ENC" 0X01 0X01 | MEANS THE 3 BYTES OF SUB-RECORD TYPE IS "ENC". IT DESCRIBES THE ENCRYPTION TYPE FOR THE CONNECTION. THE ONE BYTE SUB-RECORD 0X01 MEANS WEP IS USED FOR ENCRYPTION |
| 38 - 43 | 0X03 "TXK" 0X01 0X01 | MEANS THE 3 BYTES OF SUB-RECORD TYPE IS "TXK", WHICH INDICATES WHICH WEP KEY IS USED AS TRANSMIT KEY. THE ONE BYTE SUB-RECORD 0X01 MEANS THE WEP KEY INDEX IS 1 |
| 44 - 62 | 0X04 "WEP1" 0X0D 0X0123456789ABCDEF0123 456789 | MEANS THE 4 BYTES OF SUB-RECORD TYPE IS "WEP1", WHICH INDICATES THIS IS THE WEP KEY 1. THE LENGTH OF THE WEP KEY 1 IS 13 BYTE (104 BITS), AND THE WEP KEY IS 0X0123456789ABCDEF0123456789. WEP KEYS ARE AVAILABLE IN 64-BITS, 128-BITS AND 256-BITS, BUT THE ACTUAL KEY LENGTH HERE IS 104 BITS. THE REASON FOR THIS MISNOMER IS THAT THE WEP KEY IS CONCATENATED WITH AN INITIALIZATION VECTOR (24 BITS) RESULTING IN A 128 BITS TOTAL KEY SIZE |

*FIG. 15*

| BYTE | CONTENT | DESCRIPTION |
|---|---|---|
| 0 | 0X02 | RECORD TYPE LENGTH |
| 1 - 2 | "ST" | RECORD TYPE "ST" |
| 3 | 0X1A | THE RECORD LENGTH IS 26 BYTES |
| 4 - 7 | 0X01 0X02 0X01 0X01 | MEANS THE STATE STATUS IS S21, WHERE THE FIRST 0X01 INDICATES THE LENGTH OF THE FIRST FACTOR OF THE STATE STATUS. THE SECOND 0X01 INDICATES THE LENGTH OF THE SECOND FACTOR OF THE STATE STATUS. THE STATE S21 MEANS THE DEVICE IS TRYING TO SHARING VOICE OVER BLUETOOTH |
| 8 - 10 | 0X02 0X0040 | MEANS THE MINIMUM BANDWIDTH REQUEST FOR SHARING THE VOICE IS 64 KBPS (0X0040). 0X02 INDICATES THE LENGTH OF THE BANDWIDTH REQUEST IS 2 BYTES |
| 11 - 23 | 0X03 "MEM" 0X08 0X00 0X02 0X003C 0X00 0X00 0X0000 | MEANS THE 3 BYTES OF SUB-RECORD TYPE IS "MEM", WHICH IS THE OUTPUT MEMORY FOR THE P2PSM. 0X08 INDICATES THE MEMORY SIZE IS 8 BYTE, AND 0X00 0X02 0X003C 0X00 0X00 0X0000 IS THE MEMORY CONTENT. THE FIRST 0X00 INDICATES THAT THE BLUETOOTH TRANSPORT STILL HAS AVAILABLE RESOURCES. 0X02 MEANS THERE ARE ALREADY 2 CONNECTIONS EXIST ON THIS TRANSPORT. 0X003C INDICATES THAT THE ACCUMULATED THROUGHPUT IS 60%. SO THE REMAINING BANDWIDTH IS 1MBPS X (1 – 60%) = 400KBPS. 0X00 0X00 0X0000 MEANS THE TRANSPORT WIFI IS FULLY AVAILABLE |
| 24 - 29 | 0X02 "TI" 0X02 0X010E | MEANS THE 2 BYTES OF SUB-RECORD TYPE IS "TI" (TIME INDEX). THE SECOND 0X02 INDICATES THAT THE LENGTH OF THE TIME INDEX IS 2 BYTES AND THE VALUE OF THE TIME INDEX IS 0X010E SECONDS, WHICH IS 4 MINUTES AND 30 SECONDS |

*FIG. 16*

DEVICES AND METHODS FOR CONTENT SHARING

FIELD

Disclosed are methods and devices for automatically coupling two or more local mobile communication devices to share content such as digital calls, music, video, documents, and games.

BACKGROUND

Digital media content such as pictures, music, documents, and video has become an indispensable part of people's daily lives. Due to the rapid development and wide deployment of wireless networks and wireless products, content sharing over a wireless network may become an efficient way to distribute media content. However, sharing and distribution is still not user-friendly.

Three-way calling among communication devices shares voice calls among three parties. However, the steps to initiate a three-way call are tedious and complicated. While the caller is on a two-way call using a cellular communication device, he or she may wish to invite a third party to the communication. The caller may press a three-way call button on the device and input the telephone number of the third party. Then, the second party will be placed on hold. After a connection with the third party is established, the caller can press the three-way button again to link the second party back to the communication. Generally, a device with two existing call connections cannot initiate or accept another call with a fourth party to augment the three-way communication to a four-way communication. Moreover, a service fee is required for a three-way call in a Public Switched Telephone Network (PSTN) system. Accordingly, a caller who initiates the three-way call will be charged for two connections. Due to the cost and complications, a three-way PSTN calling scheme may not be utilized often.

An alternative technique to the above-described three-way calling technique may include a caller on an existing two-way call setting up a point-to-point Bluetooth connection in addition to the PSTN call. However, there are multiple manual steps that the caller and third party may need to perform to pair the two devices to share the call. Again, due to the complications, users may not utilize a point-to-point Bluetooth connection to add a third party to a two-way call.

Mobile communication device users may wish to share more than just voice calls. While setting up a point-to-point Bluetooth connection allows users to share some of the above-mentioned content such as calls, pictures, music, documents, and video, most users find the Bluetooth pairing process complicated and tedious plus the transfer of content difficult.

BRIEF DESCRIPTION OF THE DRAWINGS

FIG. 14 is a table that specifies the format of the combined "BT," "BT conf length," and "BT configuration" fields of FIG. 13;

FIG. 15 is a table that specifies the format of the combined "Wla," "WiFi conf length," and "WiFi configuration" fields shown in FIG. 13; and FIG. 16 is a table that specifies the format for the combined "St," "State info length," and State information" fields shown in FIG. 13.

DETAILED DESCRIPTION

Figure 1:
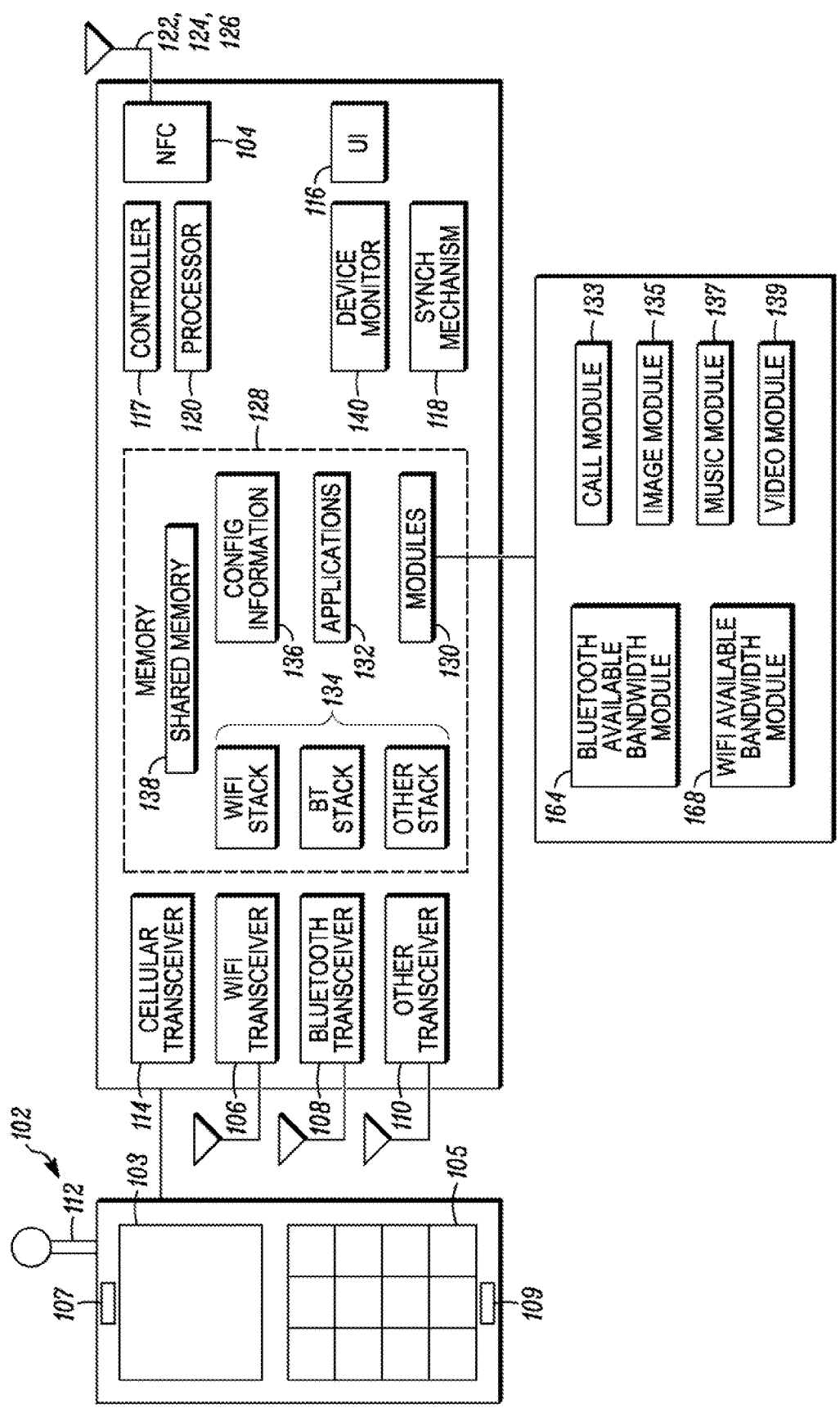
FIG. 1 depicts a mobile communication device in accordance with an embodiment including a near field communication (NFC) device and at least one short-range transceiver.

Today's wireless devices typically are able to support multiple wireless technologies such as cellular plus WiFi, Bluetooth, UWB, etc. Usually, the setup of a short-range wireless connection (such as WiFi, Bluetooth, etc.) requires some basic technical knowledge. The configuration procedures provided with the products are often not understood by average, non-technical consumers. As a result, wireless transfer of digital content between local devices often occurs over the first available wireless link or as selected by an uninformed user. This wireless link may not be the best choice for quality, user experience, power, and/or cost savings. For example, the transmission power for Bluetooth class 2 is 2.5 mW (4 dBm). It can provide up to 1 Mbps data rate with 10 meters coverage. The transmission power for WiFi 802.11b is 100 mW (20 dBm). It can support up to 11 Mbps within 100 meters. For image and audio sharing, Bluetooth can provide a good service quality and consume less power than other short-range wireless transports. Although it consumes more power, WiFi may be a better choice for video content that requires more bandwidth. However, most users are not aware of the technical differences between Bluetooth and WiFi wireless links and do not know which type of wireless link is most appropriate for particular situations.

Described are methods and devices for automatically coupling two or more mobile communication devices using short-range wireless links to share content such as calls, music, video, documents, and games where two or more devices automatically determine the feasibility of sharing the content and negotiate to find an efficient manner in which to do so. In this way, the short-range set-up and content transfer between devices may be transparent to the users. Moreover, a better choice of transport may be selected without user input.

As will be described in detail below, while a first user's device application is active, at least a first user's device and a second user's device substantially automatically configure to share the content corresponding to the active application of the first device over a short-range wireless communication link. The active application of the first device may be, for example, a voice call, music playback, a document, video, or photo image display. Configuration information that is stored in memory, such as RAM, is used to configure the transport of a short-range wireless transceiver. Each device includes a near field communication (NFC) device that, when in range, initiates communication between the devices so that the devices may share content. The NFC is used to transfer configuration information so that two short-range transceivers of different devices set up compatible transport configurations.

For example, there are different modes of Bluetooth depending upon the functionalities of a communication device. Accordingly, a particular mode of Bluetooth may not be capable of communication with another mode of Bluetooth running on another device. Thus, the configuration information conveys transport configurations to promote compatibility. By the described automatic determination of compatible configurations of transports, the users of NFC-enabled devices may have limited or minimal personal interactions—just enough to establish that one or more users may bring the devices within range so that the NFC devices may initiate the communication. In one embodiment, the users may "tap-to-configure" their devices for content sharing. Accordingly, the need for complicated and tedious processes to share content may be eliminated.

As will be described in more detail below, a mobile communication device includes an NFC device and at least one short-range transceiver such as a Bluetooth transceiver or a WiFi transceiver. The NFC device may be configured to: transmit parameters such as configuration information and available bandwidth of it short-range wireless transceivers; transmit application type information; and receive another device's configuration information, available bandwidth, and application type information. After the NFC device has transmitted and received such information, a processor determines the configuration needed (and possibly the best suited) to transmit or receive digital content at an appropriate bandwidth. A short-range transceiver of the mobile communication device having a wireless transport configuration set in accordance with the determined configuration information, and also having an available bandwidth, may transmit data such as digital content appropriate to the active application type previously transmitted via the NFC. The application type information includes a maximum of one application indicator that indicates a highest priority application software program that is running on the processor.

As a result of the interaction between the two devices and their respective NFC devices, an application that is active on the first device may be opened and become active on the second device so that the data received from the first device via a short-range transport will be accessible to the user of the second device. In this way, the users of NFC-enabled devices may have limited or minimal interactions to share content. One or more users bring the devices within range so that the NFCs may initiate setting up short-range communication between the devices; and the appropriate transport, application, and digital content is determined without each user having to set up the transport and select the content application manually. Accordingly, the need for complicated and tedious processes for setting up two or more devices to share content may be eliminated.

Advantageously, the above-described configuration process may be used for configuring a plurality of devices. For example, the below-described method may include implementing a point-to-multipoint (P2M) connection in which the first wireless device has a short-range wireless point-to-point (P2P) connection with a second wireless communication device and at least one other short-range wireless P2P connection with a third wireless communication device. Therefore, more than two devices may share content such as calls, music, video, documents, and games.

FIG. 1 depicts a mobile communication device 102 in accordance with an embodiment including a near field communication (NFC) device 104, such as an RFID tag, and at least one short-range transceiver 106, 108, and 110. The mobile communication device 102 may be implemented as a cellular telephone (also called a mobile station or user equipment) as shown or a laptop or notebook computer with communication modems, a messaging device, a personal digital assistant, a digital camera, an application-specific gaming device, a video gaming device with wireless modem, or the like. The mobile communication device 102, for example, may include a cellular antenna 112 and corresponding cellular transceiver 114. The cellular transceiver may support, for example, voice communication, the capability of transferring digital data, SMS messaging, Internet access, multi-media content access, and/or voice over internet protocol (VoIP).

The user interface 116 allows a user access to the content of an application running on the device 102. The user interface 116 may include a display 103 and a keypad 105. A speaker 107 and microphone 109 may be part of a user interface 116 for voice calls, a speech recognition application, and for other audio applications. It is understood that any type of user interface 116 is within the scope of this discussion.

Device 102 includes a near field communication (NFC) device 104 that (when in range of another NFC-enabled device) may initiate compatible configurations between two mobile communication devices so that the devices can share content. As mentioned above, an RFID is an example of an NFC device. Two mobile communication devices, each having compatible NFC devices may quickly transfer small amounts of information between them when in range. As will be described below, a minimum amount of information allows two devices to configure compatibly so that they may share content wirelessly at short range.

In the embodiment depicted in FIG. 1, at least one NFC device 104 is in communication with a controller 117 that may, in turn, be in communication with a processor 120. For example, the processor 120 may be a real-time voice processor for voice call sharing. A real-time voice processor 120 may be utilized because speech processing can be performed in a different manner than a music player at an application layer. It is understood that a processor 120 may be utilized for any suitable purpose.

As mentioned above, the NFC device 104 transmits short-range transceiver configuration information 122, available bandwidth 124 for each transport configuration, and active application type information 126. The NFC device 104 can also receive another device's configuration information, available bandwidth, and application type information from the other communication device's NFC device. If the controller 117 can match transport configurations, corresponding bandwidths, and application types to determine that the two devices can share content wirelessly, the two devices may implement state machines in parallel as will be described later. If the parallel state machines each conclude that content can be transferred wirelessly between the two devices, the controller 117 initiates communication between the two devices via a selected short-range transceiver. As previously mentioned, the mobile communication device 102 includes at least one short-range transceiver 106 that can be, for example, of the Bluetooth or WiFi type. Additional short-range transceivers 108 and 110 may provide more transport options between two or more devices. Of course, a short-range transceiver may be of any suitable type.

The mobile communication device 102 further includes a memory 128 and modules 130 that carry out certain processes of the methods as described herein. Modules may include, for example, a Bluetooth available bandwidth module 164 and a WiFi available bandwidth module 168 that keep track of bandwidth utilizations by the device 102 for each transport, as well as modules to determine the content type and availability of applications, such as a voice call module 133, an image module 135, a music module 137, and/or a video module 139. Steps of methods may involve modules and other modules (not discussed here) may be inferred by the methods discussed herein. The modules can be implemented in software, such as in the form of one or more sets of pre-stored instructions, and/or hardware. The modules may be installed at the factory or can be installed after distribution by, for example, a downloading operation. The operations of the device in accordance with the modules will be discussed in more detail below.

Software applications 132 may be stored in memory 128 such as ROM and may include, for example, a call application, an image application, an audio application, a video application, a word processing application, and other applications. It is understood that any content processing application is within the scope of this discussion. One or more types of content processing applications may be executed by the controller 117. Short-range transceiver software stacks 134, include a WiFi stack that would be loaded onto WiFi transceiver 106, a Bluetooth stack that would be loaded onto Bluetooth transceiver 108 and/or other short-range wireless communication software stacks that may be loaded onto another type of transceiver 110. In other implementations, the software stacks 134 may be in different memory structures. For example, the shared memory 138 may be the same as or a subset of memory 128, or may be independent of memory 128. The software stacks 134 and the applications 132 may be stored in the memory 128 and may be updated separately.

The configuration information 136 may be updated either upon power up of the device 102 or when the transport configuration has been changed by a device monitor 140 which may be a component of the controller 117. The device monitor 140 tracks information relating to the short-range wireless transceivers 106, 108, 110, and the applications 132. It records this information as device state information. The application information 132 may be updated either when a "tap-to-configure" action (discussed below) occurs or when content sharing is established. As discussed above, the communication by the NFC device 104 of configuration information 122, available bandwidth 124, and application type information 126 can be accessed via the NFC device 104 transponder link. A device record list that can store NFC-communicated information resides in memory 128.

When this device 102 receives configuration information, available bandwidth, and application type information of another device, this device 102 may find an appropriate configuration for content sharing with the other device, bring up the appropriate software stack 134, establish a short-range wireless connection, bring up the application 132 corresponding to the content to be shared, and start to share the content via the established short-range transceiver, for example, 106, 108, or 110.

A synchronization mechanism 118 automatically determines the selection, configuration, and setup of a short-range transceiver 106, 108, or 110, automatically selects and configures corresponding applications 132 for the sharing of content, and automatically synchronizes the sharing procedure. As mentioned, the device monitor 140 monitors and modifies the device state information, including configuration information 136, when the device state and/or configuration changes.

Figure 2:
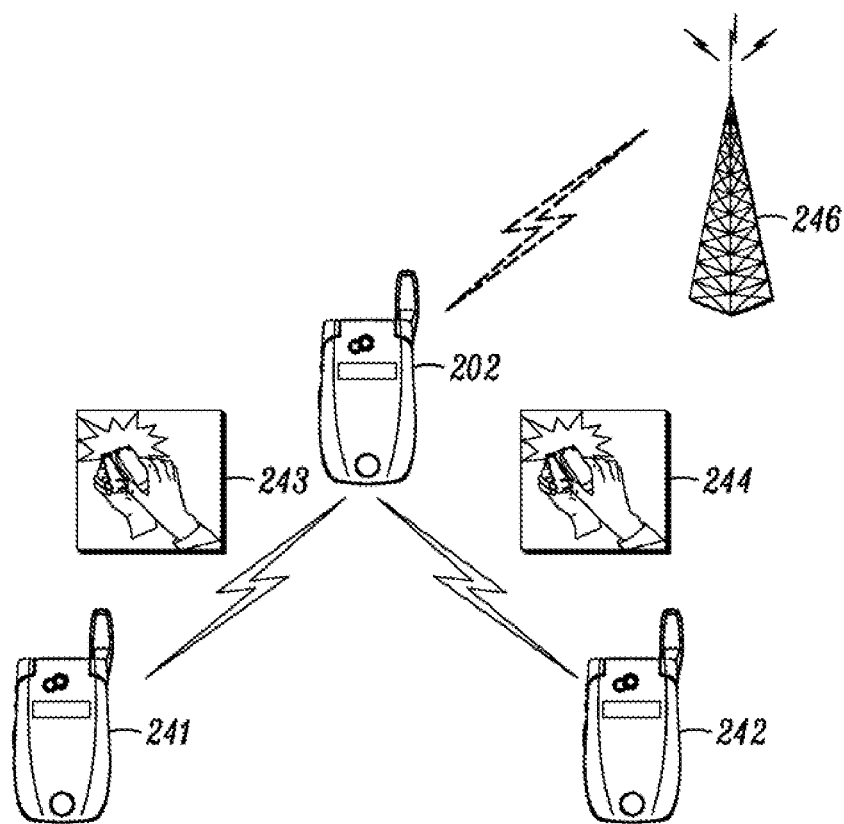
FIG. 2 depicts a "tap-to-configure" example including a first device, a second device, and a third device, with the first device having voice communication over a cellular network.

FIG. 2 depicts a "tap-to-configure" example including a first device 202, a second device 241, and a third device 242. In this example, the first device 202 is in a two-way voice call with a remote communication device (not shown) via a network 246. The devices 202, 241, and 242 may each be implemented as wireless communication device 102 in accordance with FIG. 1. The network 246 may be any type of wireless network including an ad hoc or wireless personal area network, a WiFi or wireless local area network, and a cellular or wireless wide area network. Likewise, the network 246 may be of any suitable configuration. The depiction of a network in FIG. 2 is simplified for illustrative purposes.

As mentioned above, in addition to voice communications, mobile communication devices may include features such as still and video cameras, video streaming and two-way video calling, email functionality, Internet browsers, music players, FM radios with stereo audio, games, word processors, and organizers. Content for feature applications that may run on a mobile communication device includes, for example, voice content type, image content type, audio content type, video content type, and document and text content type. When an application is active on the mobile communication device, content relating to the application can be made available to the user of the device. In the example of FIG. 2, voice communication is transmitted via the network 246 to the device 202. With a "tap-to-configure" 243 between device 202 and device 241, a short-range wireless connection between device 202 and 241 may be set up to share the voice communication. In the same or another embodiment, a "tap-to-configure" 244 between device 202 and device 242, sets up a connection between device 202 and 242 substantially transparently to the users.

With a "tap-to-configure" 243, the NFC device 104 (see FIG. 1) of mobile communication device 202 transmits to the second device 241 short-range transceiver 106, 108 and 110 parameters such as configuration information 122 and available bandwidth 124, plus application type information 126, and receives the second device's configuration information 122, available bandwidth 124, and application type information 126. Additionally, with a "tap-to-configure" 244 motion, the NFC device 104 of mobile communication device 202 may transmit configuration information 122, available bandwidth 124, and application type information 126 to a third device 242, and receive the third device's configuration information, available bandwidth, and application type information. It is understood that other information and/or parameters may be exchanged during a "tap-to-configure" action.

A "tap-to-configure" characteristic allows a small amount of information to be transmitted between two NFC devices of two mobile communication devices. Advantageously, users may tap, nearly tap, and/or bring together to a predetermined distance (that can be determined by the configuration of the NFC devices), their devices without being required to hold the mobile communication devices together for an extended period. In a short period of time, the NFC device 104 (see FIG. 1) can provide information to determine an appropriate short-range transport (via a short-range transceiver 106, 108 and/or 110) for transmitting and receiving digital content from one device to the other device. The transport could be for example, Bluetooth, WiFi, and/or another transport. The available bandwidth of the transports may be a determining factor in selecting a particular transport.

Where a voice call with a remote device (not shown) is taking place as an active application on the mobile communication device 202, a voice call sharing application software program may be selected and configured on two devices such as 202 and 241 for transmitting voice content from the first wireless communication device to the second wireless communication device over a short-range wireless communication link to result in a 3-way call. Accordingly, the "tap-to-configure" characteristic may simplify the process of connection establishment and content sharing over wireless local connectivity such as Bluetooth or WiFi. While a first user's application is active in, for this example, a voice call, the NFC devices assist to substantially automatically set up compatible short-range wireless transceivers.

The wireless short-range transceivers are set up to share the content corresponding to the active application of the first device 202 between the first device 202 and second device 241. Another software program on the second device 241 may be initiated to facilitate the voice call sharing. For example, the processor 120 (see FIG. 1) may be a real-time voice processor for voice call sharing. Real-time voice processors on both devices 202 and 241 may be utilized because speech processing may be performed in a different manner than a music player at an application layer. Therefore, with a "tap-to-configure" 243 motion, the devices 202 and 241 may automatically select and configure corresponding applications for both devices for sharing content, and may automatically synchronize the sharing procedure among the participating devices 202, 241.

FIG. 2 further illustrates various relationships that a plurality of devices may have with one another while in short-range communication with one another. A "tap-to-configure" 244 motion with device 242 sets up a second short-range wireless connection between device 202 and device 242. It is understood that any number of devices may have a connection set up between them with a "tap-to-configure" motion as long as bandwidth is available. In this manner, device 202 is in a "point-to-multipoint" (P2M) configuration with devices 241 and 242. Also, devices 202 and 241 are in a "peer-to-peer" configuration as are devices 202 and 242.

Figure 3:
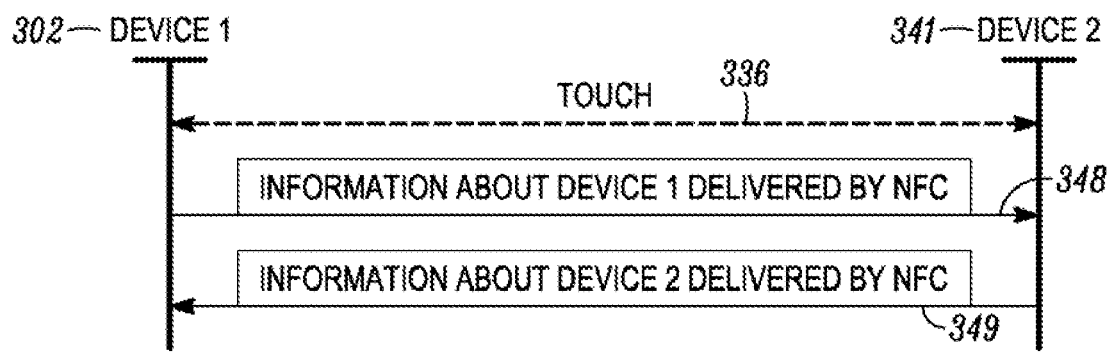
FIG. 3 is a high-level timing diagram illustrating the "tap-to-configure" sequence of events between a first device and a second device in accordance with an embodiment.

FIG. 3 is a high-level timing diagram illustrating the "tap-to-configure" sequence of events between a first device 302 and a second device 341 (equivalent to the first device 202 and the second device 241 shown in FIG. 2). The devices may touch or otherwise come within range of one another 336 so that their respective NFC devices establish a near-field communication link 348. Information passed from device 302 and received by device 341 through the transponder link 348, as discussed above, may include the first device's configuration information, available bandwidth, and application type information. Likewise, information passed from device 341 and received by device 302 through the transponder link 349 may include the second device's configuration information, available bandwidth, and application type information. An NFC device 104 (see FIG. 1) may transmit and receive information at, for example, 400 KB/sec. The data format for the communication between devices in accordance with their respective NFC device is discussed in detail below.

Figure 4:
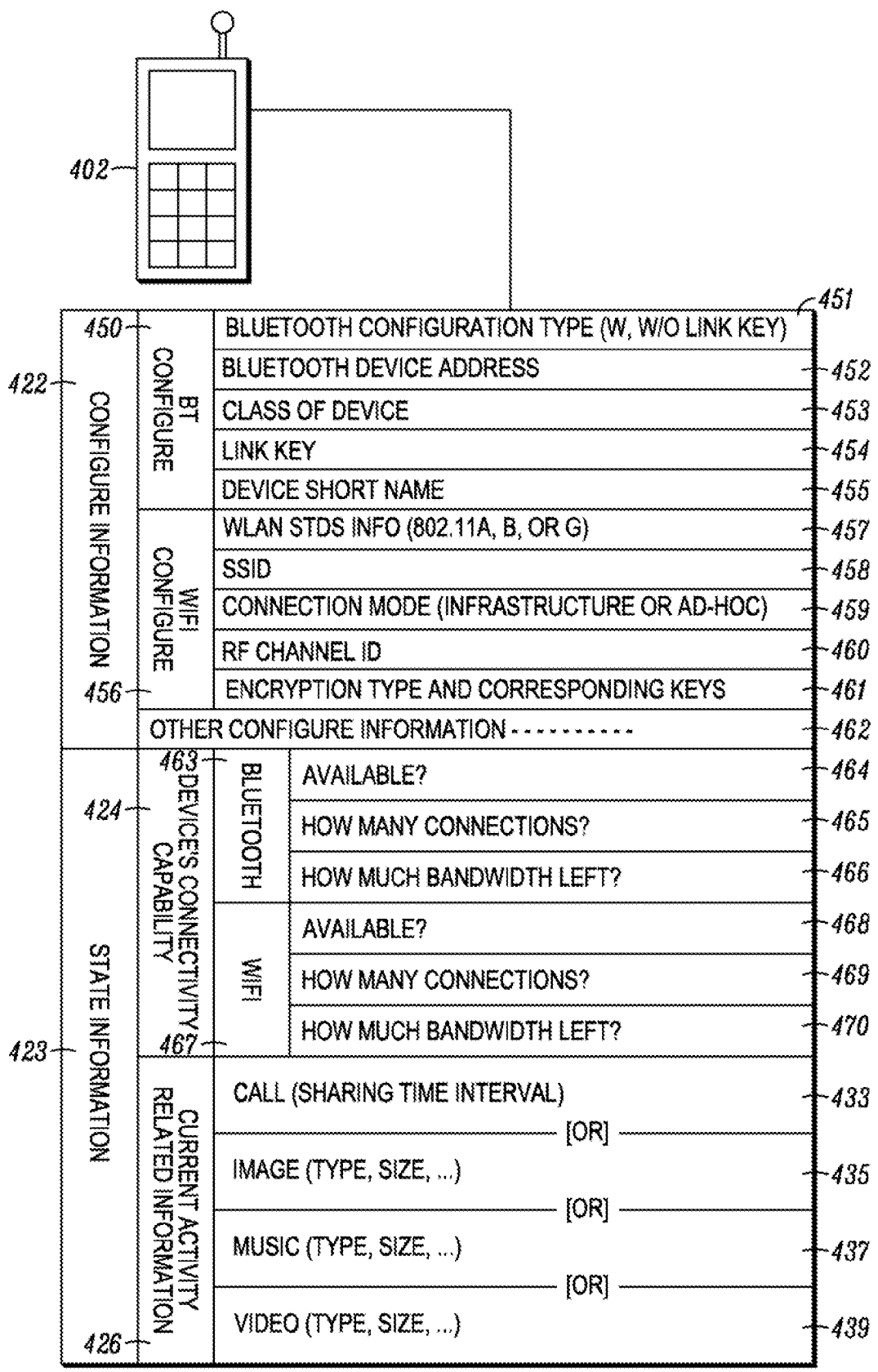
FIG. 4 is a high-level diagram of different possible components of the configuration information, the available bandwidth, and the application type of a wireless communication device that may be transmitted via its NFC device to another wireless communication device.

FIG. 4 is a high-level diagram of different possible components of the configuration information 422, the available connectivity capabilities 424, and the application type 426 that a wireless communication device 402 may transmit via its NFC device 104 (see FIG. 1) to another wireless communication device. As discussed above, the disclosed methods and devices make use of the sharing of short-range device configuration information, bandwidth availability information, content information, and application information to automatically synchronize the content sharing between two or more NFC-compatible wireless devices to provide high-quality short-range content sharing and save battery power. In one embodiment, a specific data format is used to encapsulate the NFC-transmitted information. It is understood that any appropriate data format may be employed.

In the case of content sharing among mobile devices, for example devices 202 and 241 (see FIG. 2), the NFC-transmitted data may include, for example, the short-range wireless transceiver capability of the mobile devices, the detailed configuration information of each short-range wireless transceiver, the type and detailed configuration information of the application consuming the sharing content, and the type, size, pointer and other relevant information of the sharing content. A method for content sharing may be able to fulfill the following functionalities: automatically record and update the NFC-transmitted information, transfer the NFC-transmitted information among participants, automatically synchronize the configuration and setup of the short-range wireless connection, automatically select and configure corresponding applications for the sharing content, and automatically synchronize the sharing procedure among mobile devices. In one embodiment, a generic method and apparatus may provide the above functionalities along with a high quality user experience and battery life savings.

A solution for the sharing task may be carried out transparently to the users or with minimal user interaction. A device record list can store entries of NFC-communicated information. As mentioned above, the device record list is in memory 128 (see FIG. 1). Each entry of the device record list may have a unique device ID and the NFC-transmitted information for that device. The unique device ID may be a combination of the Bluetooth device address and the WiFi MAC address or may be other information that can identify the device. The NFC-transmitted information of the record may include (i) a permanent part and (ii) a variable part. An example of a permanent part of the NFC-transmitted information is the device's local connectivity capabilities. An example of a variable part of the NFC-transmitted information is a device's state reflecting current main activity, e.g. "VOICE CALL" or "PLAYING AUDIO."

If no matching device ID is found in the device record list, it may mean that a particular exchange is the first instance of a "tap-to-configure" between the two wireless communication devices. The second device can record the unique device ID and other information and configure its short-range communication interface (e.g., Bluetooth, WiFi or other connectivity modules 134 (see FIG. 1)) for execution by the controller 117 to effect operation of the short-range transceivers. If the second device finds a matching record for the first device's ID, it can update the variable part of the record upon receiving peer NFC-transmitted information. When the entries are updated, each device activates its own synchronization mechanism 118 and executes its own Peer-to-Peer State Machine (P2PSM) including configuring its short-range wireless interface, establishing a short-range wireless connection with the other device, bringing up the application (application modules for audio or voice call 133, image 135, music 137, video 139, or other medias) that corresponds to the device state and the sharing content, and starting the content sharing.

In this example, configuration information 422 can include a Bluetooth configuration 450 with Bluetooth configuration type 451, a Bluetooth device address 452, a class of device 453, a link key 454, and a device short name 455. Also for example, configuration information can include a WLAN configuration 456 including information such as WLAN standards information (e.g., IEEE Standard 802.11a, 802.11b, and/or 802.11g) 457, a Service Set Identifier (SSID) 458, a connection mode 459, an RF Channel ID 460, and an encryption type and corresponding encryption key(s) 461. Other configuration information 462 can be included as appropriate. The device 402 may provide information relating to the connectivity capabilities 424 that it has available.

For example, were the device currently substantially utilizing its WiFi transceiver, it may have little or no bandwidth available on a WiFi transport. However, it may have available Bluetooth bandwidth. It may send to the other device via the NFC device 104 (see FIG. 1), information relating to Bluetooth 463, such as whether any resources are available for one or more Bluetooth transports 464, how many connections are already utilizing one or more transports 465, and how much bandwidth is left for one or more transports 466. On the other hand, were the device 402 currently substantially utilizing its Bluetooth transceiver, it may have little or no bandwidth available on a Bluetooth transport. However, it may have available WiFi 467 bandwidth. It may send to the other device via the NFC device 104, information such as how much WiFi bandwidth is available for one or more WiFi transports 468, how many connections are already utilizing one or more WiFi transports 469, and how much bandwidth is left for one or more WiFi transports 470.

Also, the device 402 may send via its NFC device 104 (see FIG. 1) application type information 426 that may be, for example, a maximum of one application indicator that indicates a highest priority application software program that is running on the device's processor. If multiple applications or functions are active, a user interface may prompt the user with options from which to choose. For example, after two phones "tap-to-configure," a user of one phone may choose to join a telephone call in which the other phone is engaged. The application indicator may be, for example, a call sharing application indicator 433, an image viewer application indicator 435, an audio player application indicator 437, a video player application indicator 439, or a document and text editing application indicator (not shown). Also, the application type information 426 may include related content parameters such as time, type or format, and size parameters as part of the information flow via NFC devices 104 between devices such as 402 and 241 (see FIG. 2).

As mentioned above, more than two devices may establish compatible wireless transport configurations via a "tap-to-configure" touch. For example, a point-to-multipoint (P2M) connection may be implemented in which the first wireless device has a short-range P2P connection with a second wireless communication device and at least one other short-range wireless P2P connection with another wireless communication device.

Figure 5:
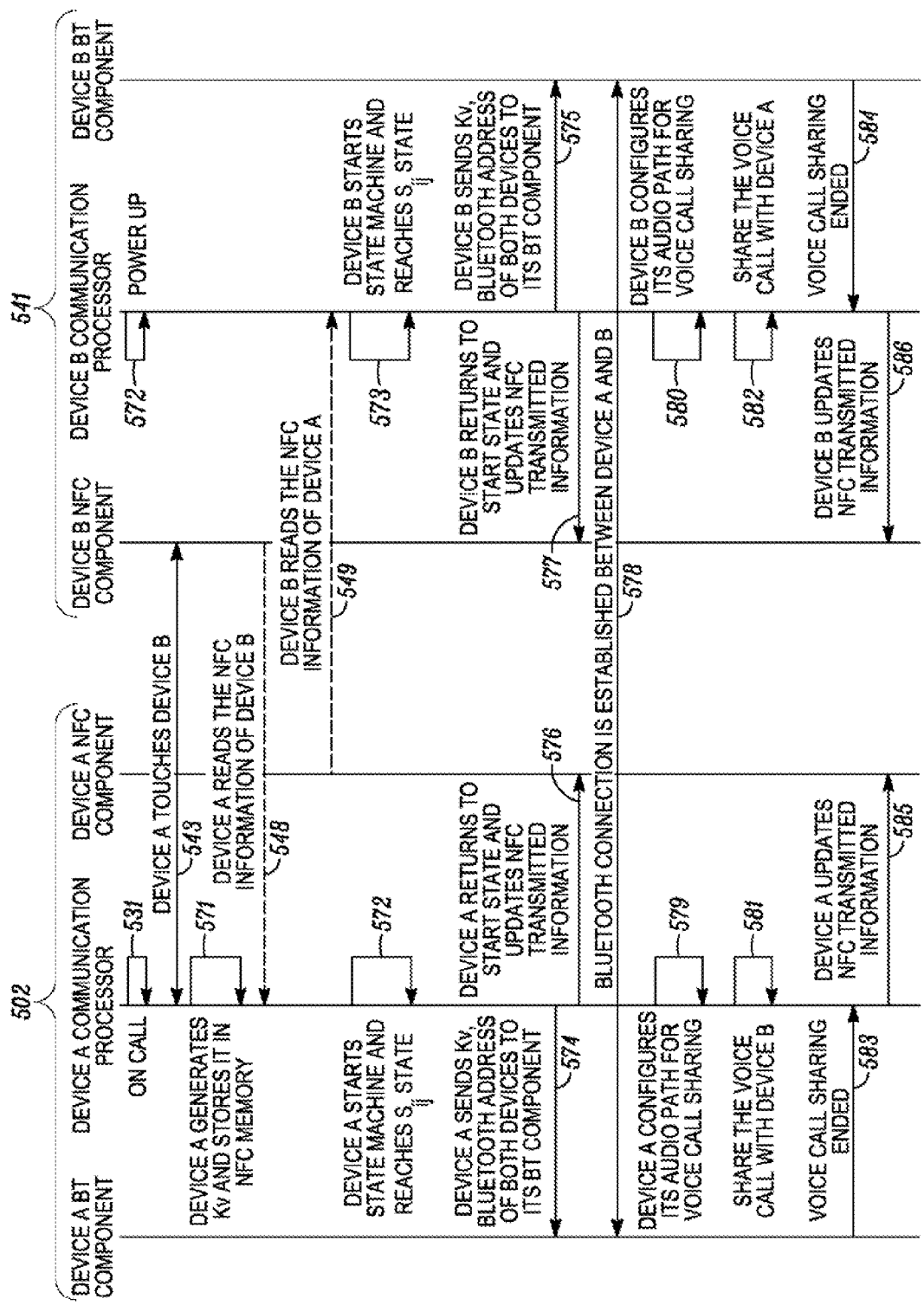
FIG. 5 is a signal flow diagram illustrating a Bluetooth connection using a virtual link key and NFC information of two devices in accordance with an embodiment.

FIG. 5 is a signal flow diagram illustrating a Bluetooth connection using a virtual link key and NFC information sent between a first wireless communication device 502 and a second wireless communication device 541. The devices 502, 541 may both be implemented as a wireless communication device 102 of FIG. 1. As mentioned above, the processor 120 (see FIG. 1) may be a real-time voice processor for voice call sharing. A real-time voice processor 120 is assumed in this example because sharing a voice call locally requires capability for processing voice audio streams from two or more different places simultaneously inside the device 502. The device combines inbound audio from multiple channels together before sending it to the speaker. It directs the audio generated by the device (as well as the combined audio) to all other participants including, for example, device 541 and a device 242 (see FIG. 2). After the short-range wireless communication link is established between 502 and 541, the master device 502 may have control over client devices, for example device 541, for enhanced functions such as muting incoming or outgoing audio from/to a client participant, and/or tearing down the connection with the client.

The NFC Data Exchange Format (NDEF) specification described below can define a message encapsulation format to exchange information between two NFC Forum devices such as device 202 and 241 (see FIG. 2) or between an NFC Forum Device and an NFC Forum Tag. NDEF data can be used to encapsulate one or more application-defined payloads of arbitrary type and size into a single message construct. Each payload is described by a type identifier, a length, and an optional identifier. Type identifiers may be URIs, MIME media types, or may be NFC-specific types. The payload length is an unsigned integer indicating the number of octets in the payload. The optional payload identifier enables association of multiple payloads and cross-referencing between them.

In this example, device 502 has an active software application 531 to share with a nearby device 541. In this example, the active software application is a cellular voice call with a remote device (not shown). As discussed above, the active software application could alternately be, for example, a digital photo, MP3 music playing, etc. Device 541 is powered up 572. Both devices are assumed to be NFC Forum compatible. Device 502 "taps-to-configure" 543 (or comes close to) device 541. Device 502 generates a virtual link key Kv 571 and saves it to its NFC shared memory 138 (see FIG. 1). A virtual link key Kv is a randomized 128-bit number generated by the communication processor of the master device upon the touch of the two devices. This process may be more secure compared with using a link key 454 (see FIG. 4) because the virtual link key is generated anew every time the two devices touch via NFC.

As discussed above with respect to FIG. 4, information including configuration information, available bandwidth, and application type information is transmitted 548 from device 541 and received by device 502. Likewise, information including configuration information, available bandwidth, and application type information is transmitted 549 from device 502 and received by device 541. Transmission steps 548 and 549 can alternately occur in the reverse order or simultaneously. That is, a communication controller or processor of the master device (e.g., device 502) reads the NFC-transmitted information of the second device (e.g., device 541) via NFC during the "tap-to-configure" 543 user action. The communication controller or processor of device 541 also reads the NFC-transmitted information of the first wireless communication device 502 via NFC during the "tap-to-configure" 543.

In this example, both devices 502, 541 next enter the START state of their own P2PSM (see FIG. 9, below). Device 502 and device 541 both reach state $S_{ij}$ (for example, i=application, in this example a voice call; j=short-range transport, in this example Bluetooth) independently, based on the transferred NFC information and based on each device's own information. If there is no available channel for either one of the two devices, the state machine in the two devices will go to END state. An error message may be displayed on the user interface reporting the failure. If the two devices do not each separately conclude failure, the communication processor of device 502 passes 574 the virtual link key Kv to the selected short-range transceiver 108 (in this example, Bluetooth; see FIG. 1), along with the Bluetooth addresses of both devices. At the same time, the communication processor of device 541 can pass 575 the virtual link key Kv and the addresses of both devices to its own Bluetooth connectivity component. Thus, the virtual link key Kv is shared between both devices 502, 541.

Device 502 and device 541 determine a wireless communication channel in accordance with their respective short-range transceivers (e.g. Bluetooth transceivers) and determine the available bandwidth in accordance with their respective available Bluetooth bandwidth module 164, as well as determine the content type and availability of applications in accordance with their respective applications modules, such as a voice call module 133. That is, device 502 and device 541 both independently reach a state machine START state 576, 577 again as the result of finding the connection channel successfully. The NFC information may be updated but not necessarily re-transmitted (as will be discussed in more detail below). As a result, the first wireless communication device 502 established 578 a short-range transport such as a Bluetooth connection, with the second wireless communication device 541.

Assuming that the first wireless communication device 502 is sharing a call with the second wireless communication device 541, the device's 502 audio processor's stream routing component may control the audio mix and audio split. It may combine the audio input from the local connectivity component of device 541 and the cellular communication component of the remote device (not shown) before it sends the combined audio to the speaker. It may pick up the audio from the microphone and split it to the local connectivity components in use and to the cellular communication component if device 502 is directly involved in the cellular call. Processor 120 (see FIG. 1) of device 502 may also accept requests from the communication processor or controller 117 to mute, and/or increase/decrease voice volume for different channels. If during a call, the user of device 502 wants to exclude one direct client from the conversation temporarily, a control module can discard the data from/to that individual connection and resume it later upon request by device 502. Device 502 may keep track of the whole connection network to control device 541 (and any other devices which are not directly connected to it), or allow device 541 (or another device) to control mute, and/or increase/decrease voice volume for other devices.

For example, a device 502 may use AT commands (including non-standard AT commands) to mute the microphone of a directly-connected device 541. For control of indirectly-connected devices (not shown), a directly-connected device 541 can be used as a relay to send commands to indirectly-connected devices as addressed. Alternately, a directly-connected device may be instructed to implement its received call control commands "downstream" to other devices.

In addition to routing and mixing the various audio streams to their proper paths, the audio processor 120 (see FIG. 1) of device 502 may also accept requests from its communication processor or controller 117 to mute audio paths, increase/decrease voice volume for the different paths, or to exert any other type of control on the audio stream. The audio processor of device 502 may also be able to provide various forms of signal processing on the composite audio streams depending on which path it is operating upon. For example, the composite uplink audio stream to a short-range wireless transceiver such as Bluetooth transceiver 108 (see FIG. 1) and the short-range connectivity components may have echo cancellation, noise suppression, and any other digital filtering necessary or desirable. The audio sent from the audio processor of device 541 to the codec speaker of device 541 may also have some type of audio shaping performed on it to make the audio sound clean to the user of device 541. It may also have sidetone added for comfort.

If both devices successfully configure 579 and 580 their respective audio path, the voice call is shared 581 and 582 between devices 502 and 541 via their respective short-range wireless transceivers. If either device 502 or device 541 fails to successfully configure 579 or 580 their audio path, an error message may be reported to the user interface. If the voice call sharing is ended 583, 584 because either one of the users hangs-up the call or the connection drops for any reason, the controller 117 (see FIG. 1) of device 502 and device 541 may update 585, 586 the NFC information, which is not necessarily re-transmitted with the released connection resource.

As discussed above, the described signal flow diagram is an embodiment of the voice call sharing. It is understood that any number of alternative applications may follow the same or similar process. For example, in another embodiment, images, music, documents, or video may be similarly shared.

The single call sharing scenario can also be extended to a second case where both mobile phones are in separate cellular network calls with different parties. Here, both parties might wish to share the ongoing calls with each other, effectively creating a 4-way conference call with the two separate cellular network calls via the local connectivity component. Such a scenario may be likely to occur among friends, family members, and work colleagues in a variety of situations. Touching the two mobile phones together is a natural and intuitive way for persons to share the separate ongoing call(s) with each other.

Figure 6:
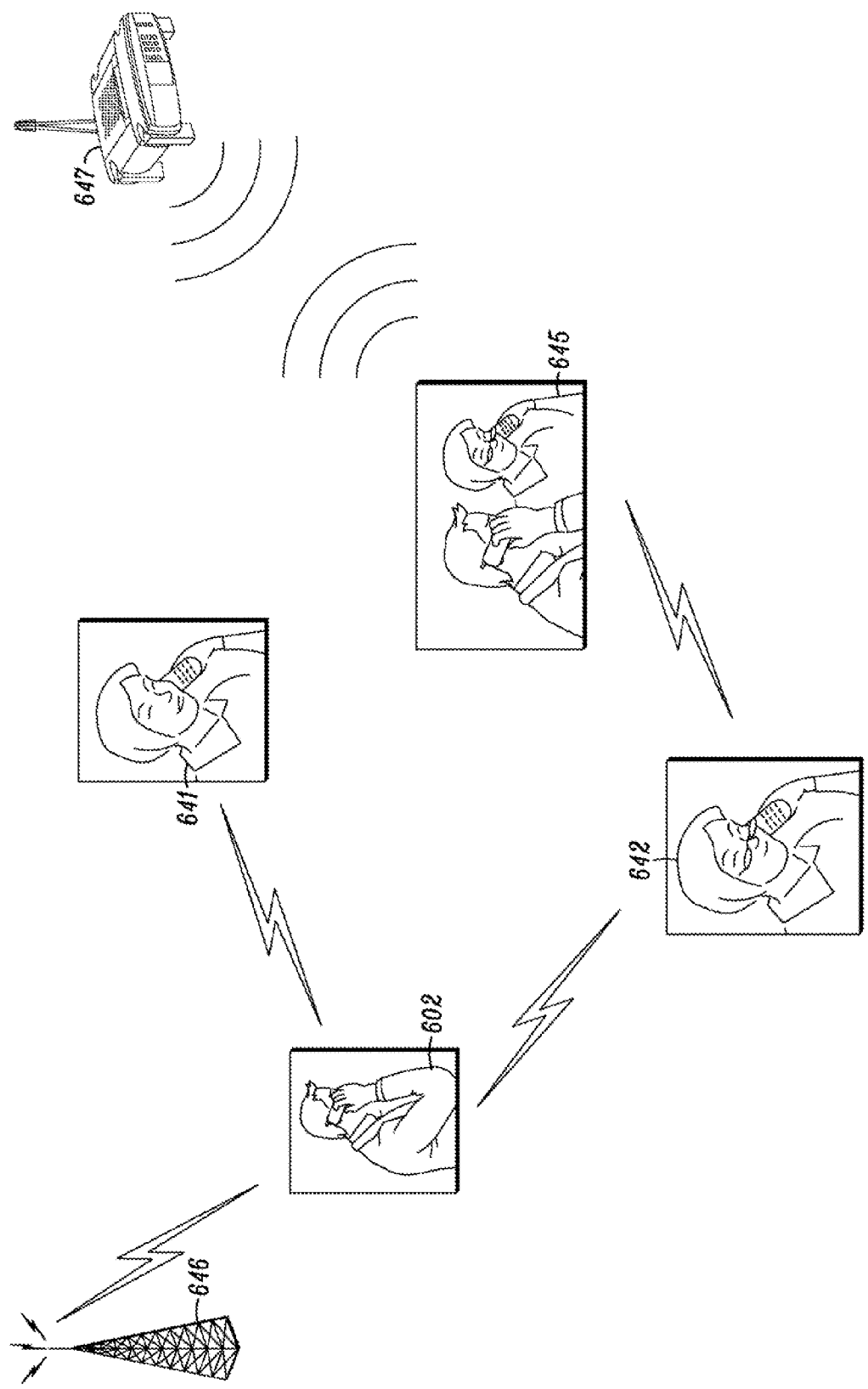
FIG. 6 depicts an example of call sharing between co-located devices.

FIG. 6 depicts an example of call sharing between co-located devices. The devices are co-located so that they may "tap-to-configure" to set up their communication. Also in this example, they communicate over short-range wireless transports such as Bluetooth or WiFi, which means if they move out of range, they will lose their connection. Device 602 is in communication with a remote party via a cellular network 646, and so the devices can share this remote party call with a variety of co-located devices. In this example, device 602 is in a "point-to-multipoint" (P2M) configuration with co-located devices 641 and 642. Also, devices 602 and 641 are in a "point-to-point" (P2P) configuration as are devices 602 and 642 and devices 642 and 645. Device 647 is a WiFi hub or router, which can be used to communicate between the device 642 and another device using Voice over Internet Protocol (VoIP), for example. Due to the various connections shown, the device 645 is sharing the same remote party telephone call with devices 602, 641, and 642.

Figure 7:
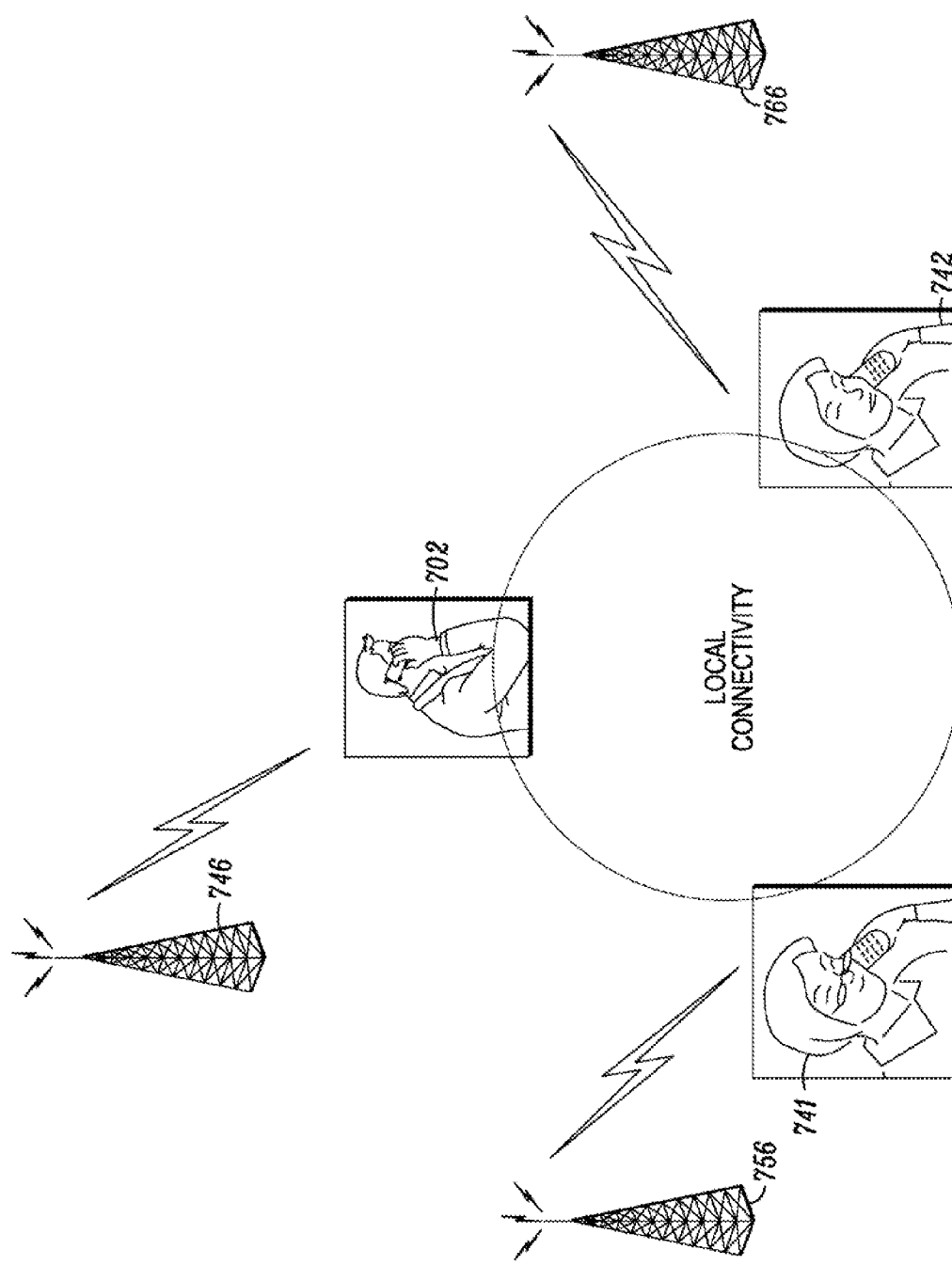
FIG. 7 depicts an arrangement where three devices may share three calls, and therefore have 6-way communication.

FIG. 7 depicts an arrangement where three devices may share three calls, and therefore have 6-way communication. In this example, device 702 is in voice communication with a remotely-located person through a cellular network 746. Device 741 is in voice communication with yet another remotely-located participant through another cellular network 756. A third device 742 is in voice communication with the last remotely-located participant through a third cellular network 766. The co-located devices 702, 741 and 742 may "tap-to-configure" to set up their communication and share in their three different voice calls to form a 6-way communication. Each device co-located 702, 741 and 742 has a point-topoint connection with the other two co-located devices, resulting in a point-to-multipoint configuration for each co-located device.

Figure 8:
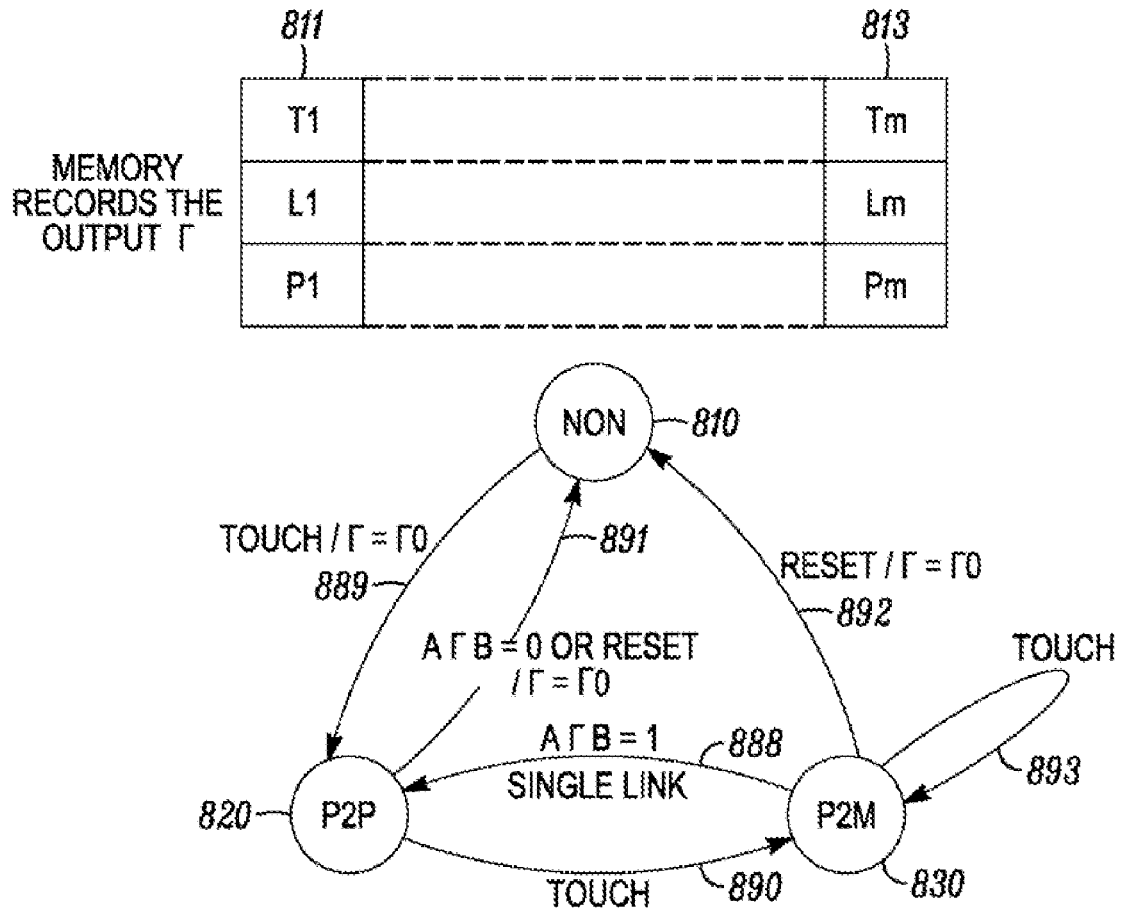
FIG. 8 depicts a high-level instance of a Synchronization Mechanism State Machine in accordance with an embodiment.

FIG. 8 depicts a high-level instance of a Synchronization Mechanism State Machine in accordance with an embodiment. The synchronization mechanism 118 state machine (see FIG. 1) runs separately on all participating devices. This high-level state machine depicts connection states. A lower-level state machine (FIG. 9) will include details of a particular connection, and due to the design of the lower-level state machine, the short-range wireless communication link selection and set-up for each device can independently come to the same conclusion.

An embodiment of a finite state machine definition is as follows: The synchronization mechanism 118 (see FIG. 1) is a sextuple $<\Sigma, F, S, s_0, \delta, \omega>$, where: $\Sigma$ is the input alphabet that is a set of inputs or events, $F$ is the output alphabet, $S$ is a finite non empty set of states, $s_0$ is an initial state, $\delta$ is the state transition function, and $\omega$ is the output function.

$\Sigma$ is the input alphabet that is a set of inputs or events. On any input or event, a corresponding transition will be triggered. $\Sigma$ includes four elements, $\Sigma=\{$TOUCH, RESET, $A\times\Gamma\times B=0$, $A\times\Gamma\times B=1\}$, where TOUCH and RESET are string inputs and $A\times\Gamma\times B=0$ and $A\times\Gamma\times B=1$ are expression inputs. TOUCH can indicate the device running the synchronization mechanism 118 has "tapped-to-configure" another device to initiate content sharing, and RESET indicates the device is rebooted or software reset.

The expression $A\times\Gamma\times B$ is defined as follows. $\Gamma$ is a matrix of dimension 3×m, and is the output of the state machine. A is a row vector, that is, a matrix of dimension 1×3, A=[0 1 0]. B is a column vector, that is, a matrix of dimension m×1, B=[1 1 ... 1]$^T$. B is a matrix transpose of [1 1 ... 1] which contains m 1s. The notation $A\times\Gamma\times B$ is to be understood as matrix multiplication. The expression $A\times\Gamma\times B$ evaluates to the sum of the elements of the second row of the matrix $\Gamma$. $A\times\Gamma\times B=0$ can indicate there is no current connection established on this device, as explained below. $A\times\Gamma\times B=1$ can indicate there is only one current connection established on this device. The detailed definition of $\Gamma$ is shown in the following paragraph.

$F$ is the output alphabet. When a transition occurs, a corresponding output $\Gamma$ will be produced. $F$ is the set of possible matrices $\Gamma$, that is, $F=\{\Gamma\}$ where $\Gamma$ is a matrix of the form $$\Gamma = \begin{bmatrix} T1 & T2 & ,,, & Tj & ... & Tm \\ L1 & L2 & ... & Lj & ... & Lm \\ P1 & P2 & ... & Pj & ... & Pm \end{bmatrix}.$$

$\Gamma$ has 3×m elements, where m is the number of transports the mobile device has. Tj indicates whether the transport of type j is fully occupied or not. Tj=1 indicates the transport of type j is fully occupied. The full occupation may be because there is no more channels available or there is no bandwidth left. Tj=0 indicates the transport of type j is still available for further uses. Lj is the number of connections existing for transport of type j. For example, if the Bluetooth transport is associated with i=1, L1=4 indicates that four Bluetooth connections exist. Pj is the accumulated throughput used on the transport of type j, given as a percentage.

As an example, suppose a device has two connections with two other devices via a WiFi ad hoc mode and that the data rate can be 11 Mbps. The WiFi standards (including IEEE Standard 802.11g) require only that ad-hoc mode communication supports 11 Mbps data rate. An example of $\Gamma$ corresponding to this situation is given below.

$$\begin{bmatrix} 0 & 0 & ,,, & 0 & ... & 0 \\ 0 & 2 & ... & 0 & ... & 0 \\ 0 & 40 & ... & 0 & ... & 0 \end{bmatrix}$$

In this example, the WiFi transport is associated with j=2. L2=2 indicates there are two WiFi connections. P2=40 indicates that 40% of the WiFi data rate is used and there is 60% bandwidth left, which is 11 Mbps×60%=6.6 Mbps.

$S$ is a finite non-empty set of states. $S=\{$NON, P2P, P2M$\}$, where NON indicates the device has no sharing activity, P2P indicates the device is sharing content with a single other device, and P2M indicates the device is sharing content with multiple other devices.

$s_0$ is an initial state. $s_0$=NON, that is, the state machine begins in a state in which the device has no sharing activity. The device is in the initial state of the state machine upon power up or hardware or software reset. The device may also re-enter the state NON upon completion of sharing activity, as shown in Table 1.

$\delta$ is the state transition function: $\delta: S\times\Sigma \to S\delta$ describes the resulting state of the state machine when the state machine receives an input, that is, an element of $\Sigma$, while the state machine is in a particular state, that is, a particular element of $S$. A complete specification of $\delta$, in accordance with an embodiment, is given in Table 1.

TABLE 1

| State | Input | New State |
|---|---|---|
| NON | TOUCH | P2P |
| P2P | A × Γ × B = 0 | NON |
| P2P | RESET | NON |
| P2P | TOUCH | P2M |
| P2M | A × Γ × B = 1 | P2P |
| P2M | TOUCH | P2M |
| P2M | RESET | NON |

Elements of $S\times\Sigma$ that cannot occur or that do not lead to transitions have been omitted from Table 1.

$\omega$ is the output function. $\omega: S\times\Sigma \to F$. $\omega$ describes the output produced by the state machine when the state machine receives an input, that is, an element of $\Sigma$, while the state machine is in a particular state, that is, a particular element of $S$. As described above, $\Gamma$ is a 3×m matrix whose possible values constitute the output alphabet of the state machine. A value of $\Gamma$ with particular significance is denoted $\Gamma0$:

$$\Gamma 0 = \begin{bmatrix} 0 & 0 & ,,, & 0 & ... & 0 \\ 0 & 0 & ... & 0 & ... & 0 \\ 0 & 0 & ... & 0 & ... & 0 \end{bmatrix}$$

(a 3×m dimension matrix with all 0s).

$\Gamma0$ signifies that none of the transports of the device are occupied, that there are no connections with other devices, and that no bandwidth is consumed. Table 2 provides a specification of $\omega$ in accordance with an embodiment.

TABLE 2

| State | Input | Output |
| --- | --- | --- |
| NON | TOUCH | $\Gamma = \Gamma 0$ |
| P2P | $A \times \Gamma \times B = 0$ | $\Gamma = \Gamma 0$ |
| P2P | RESET | $\Gamma = \Gamma 0$ |
| P2P | TOUCH | $\Gamma = \Gamma$ |
| P2M | $A \times \Gamma \times B = 1$ | $\Gamma = \Gamma$ |
| P2M | TOUCH | $\Gamma = \Gamma$ |
| P2M | RESET | $\Gamma = \Gamma 0$ |

Thus, in certain situations the Synchronism Mechanism State Machine output $\Gamma$ is reset to $\Gamma 0$ and in other situations the output of the high-level Synchronism Mechanism State Machine remains the same at $\Gamma$.

FIG. 8 includes the transitions between states that are associated with an input/output pair. The input above the slash is the event condition for that transition. The output below the slash is the result of the transition. The output will be stored in memory, such as the shared memory 138 (see FIG. 1) associated with the state machine. Outputs lacking changes are not shown in FIG. 8. In this example there are two NFC-compatible wireless communication devices, such as devices 202 and 241 (see FIG. 2) having memory outputs where T is transport, L is number of links and P is bandwidth that is associated with the NFC-transmitted information 122, 124 and 126. The output $\Gamma$ is stored in the shared memory 138 of each device 202, 241 in order to support content sharing between the two devices.

At the beginning, the device 202 (see FIG. 2) is in the NON state 810, which can indicate the device has no sharing activity. When it touches 889 another device (for example, device 241), it transitions to the P2P state 820 and initializes the output $\Gamma$ to $\Gamma 0$. In the P2P state 820, a Peer-to-Peer State Machine (P2PSM) will be called. See FIG. 9 below. P2PSMs running in parallel on the two devices can synchronize the sharing procedure of those two devices and set or clear the column 811, 813 and/or another column in the output matrix $\Gamma$ corresponding to the transports for sharing. Detailed operation of the P2PSM will be given below. In the P2P state 820, if there is no connection existing for this device ($A \times \Gamma \times B = 0$) or the device is reset 891 by software or reboot, the synchronization mechanism 118 (see FIG. 1) returns to the NON state 810.

In the P2P state 820, if the device touches a third device, such as device 242 (see FIG. 2), it transitions 890 to the P2M state 830. In the P2M state 830, every time it touches another device, it will re-enter 893 this P2M state 830. Anytime it enters or re-enters 893 the P2M state, a P2PSM will be called. In the P2M state 830, if there is only one connection for this device ($A \times \Gamma \times B = 1$) it will return 888 to the P2P state. ($A \times \Gamma \times B = 1$) indicates there is only one element of a second row of matrix $\Gamma$ that is non-zero and this element is equal to 1. In the P2M state 830, if the device is reset by software or reboot 892, it will return to the NON state 810.

Figure 9:
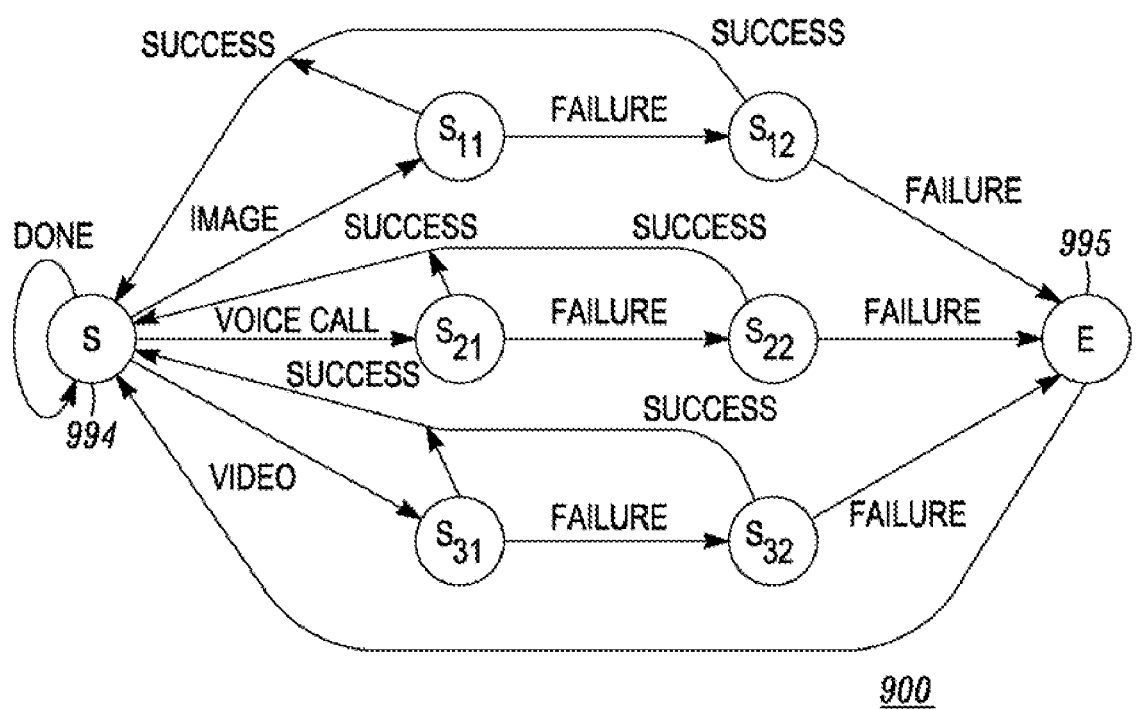
FIG. 9 illustrates an example of a Peer-to-Peer State Machine (P2PSM) running on a specific device that may be customized to the media types and transports that the device supports.

FIG. 9 illustrates an example of a P2PSM 900 running on a specific device that may be customized to the media types and transports that the device supports. At least two parties are involved in content sharing. The device 202 (see FIG. 2) holding the content may be called a master or media server. The device 241 receiving content may be called a slave, client, or media renderer. As mentioned previously, the P2PSM is activated whenever a device enters the high-level P2P state 820 or the P2M state 830 shown in FIG. 8.

In this sample situation, both devices 202, 241 (see FIG. 2) are capable of Bluetooth and WiFi communication, and both support image, audio including voice calls, and video media content. With n as the number of application types the mobile device supports (such as image, video, mp3 music, voice call, etc.) and m as the number of short-range wireless transports the mobile device has (such as Bluetooth, WiFi, UWB, etc.), in this example n (applications)=3 and m (short-range wireless transports)=2. Thus the example P2PSM in each device 202, 241 has n×m+2 (or 3×2+2)=8 states. The Start (S) state 994 in each P2PSM indicates there is no content being shared or prior content sharing has begun successfully. The End (E) state 995 indicates the devices cannot share media content over any available short-range wireless (Bluetooth or WiFi) transport. If the state machine enters the End state 995, an error message may propagate to the user interface. The other six states are explained as below in Table 3.

TABLE 3

| State | Definition |
| --- | --- |
| $S_{11}$ | Share image content over Bluetooth connection. |
| $S_{12}$ | Share image content over WiFi connection. |
| $S_{21}$ | Share audio content over Bluetooth connection. |
| $S_{22}$ | Share audio content over WiFi connection. |
| $S_{31}$ | S31 - Share video content over Bluetooth connection. |
| $S_{32}$ | S32 - Share video content over WiFi connection. |

In this example, the Bluetooth transport has higher priority than the WiFi transport because Bluetooth consumes less power, which is important for mobile device battery life. Thus, the Bluetooth is explored first (e.g., $S_{X1}$=BT, $S_{X2}$=WiFi) in this example.

For audio media sharing, the above-described P2PSM synchronization procedure may be followed (branch $S_{2X}$, states $S_{21}$, $S_{22}$). For video content sharing, because video media sharing requires more bandwidth, a specific policy may be added to the P2PSM (branch $S_{3X}$). For example, in FIG. 9, the condition for the transition from state $S_{31}$ to $S_{32}$ can be modified from: FAILURE={The Bluetooth interface is in use; cannot setup Bluetooth connection; the Bluetooth connection is broken} to FAILURE=FAILURE∪{streaming frame rate <15 frames/second (or another pre-defined threshold)}. The condition for the transition from state $S_{32}$ to the End state 995 can be similarly modified. Except for this modification, the synchronization procedure may stay the same as above. By adding this specific policy, a pre-defined quality for video sharing may be guaranteed.

The device that initiates the exchange is defined by the Near Field Communication Interface and Protocol (NFCIP-1) specification. As mentioned above, the NFC-transmitted information may have the configuration information and any currently successful state information for P2M. The synchronization mechanism 118 (see FIG. 1) saves the exchanged state information in the shared memory 138.

During communication via a short-range transceiver 106, 108 and/or 110 (see FIG. 1), both devices stay in the same state of their respective high-level Synchronization Mechanism State Machines (see FIG. 8). During the transition from one state to the next in the Synchronization Mechanism State Machine, the shared memory of each device may be scanned. If the lower-level Peer-to-Peer State Machines (P2PSMs) running simultaneously in each device conclude that no corresponding transport is available, or the remaining bandwidth is not larger than the minimum bandwidth request for sharing media of corresponding type, a failure occurs and the transport is avoided. The synchronization of sharing between two devices may be guaranteed by equivalent P2PSM state machines running on both devices and achieving the same results.

For Point-to-Multipoint (P2M) sharing, if two devices successfully start content sharing in the P2P state 820 (see FIG. 8) and the first device touches a third device, the high-level state machine for the first device will transition to the P2M state 830 and the P2PSM will be called again for the first device and run concurrently with a P2PSM of the new device. For each device, the P2PSM will check the synchronization mechanism 118 (see FIG. 1) and shared memory 138 to make sure that a suitable transport is available.

A Synchronization Mechanism State Machine (see FIG. 8) in each device 202, 241 and 242 (see FIG. 2) may differentiate between P2P and P2M states, and the results of the P2PSM in each device depend upon the mode of the device (e.g. image, audio, etc.) and differentiate among local connectivity technology (e.g. Bluetooth, WiFi, etc.). As discussed herein, the P2PSM inputs are extended to the NFC forum frame format.

An embodiment of a peer-to-peer state machine (P2PSM) definition is as follows: The P2PSM is a sextuple $<\Sigma, F, S, s_0, \delta, \omega>$, where: $\Sigma$ is the input alphabet that is a set of inputs or events, $F$ is the output alphabet, $S$ is a finite non empty set of states, $s_0$ is an initial state, $\delta$ is the state transition function, and $\omega$ is the output function.

$\Sigma$ is the input alphabet. It is a set of inputs or events. Specifically, $\Sigma = \{1, 2, \ldots n, \text{FAILURE}, \text{SUCCESS}, j\text{-DONE}\}$, where $1, 2, \ldots n$ stand for the media content type. The inputs FAILURE and SUCCESS mean the content sharing has either failed or successfully started. j-DONE can indicate the sharing over transport j has either failed or successfully finished.

$F$ is the output alphabet. $F = \{\Gamma\}$. It has the same definition as in synchronization mechanism 118 (see FIG. 1) discussed above in connection with FIG. 8. There is a common memory space in the device shared memory 138 assigned to the output of the synchronization mechanism 118. Every P2PSM may operate on the same memory space within its device.

$S$ is a finite non empty set of states. $S = \{S, E, S_{11}, S_{12}, S_{ij}, \ldots S_{nm}\}$, where S is the start state and E is the End state. $S_{ij}$ can indicate the device starts to share media of type i over transport j. The P2PSM has $n \times m + 2$ states.

$s_0$ is an initial state. $s_0 = S$. In the initial state, no media is being shared.

$\delta$ is the state transition function: $\delta: S \times \Sigma \rightarrow S$. $\delta$ describes the resulting state of the state machine when the state machine receives an input, that is, an element of $\Sigma$, while the state machine is in a particular state, that is, a particular element of $S$. A complete specification of $\delta$ is given in Table 4 for this embodiment.

TABLE 4

| State | Input | New State |
|---|---|---|
| S | i | $S_{i1}$ |
| $S_{ij}$ | FAILURE | $S_{i(j+1)}$, where j < m |
| $S_{ij}$ | SUCCESS | S |
| $S_{im}$ | FAILURE | E |
| S | j-DONE | S |
| E | — | S |

Elements of $S \times \Sigma$ that cannot occur or that do not lead to transitions have been omitted from Table 4.

$\omega$ is the output function. $\omega: S \times \Sigma \rightarrow F$. $\omega$ describes the output produced by the state machine when the state machine receives an input, that is, an element of $\Sigma$, while the P2PSM is in a particular state, that is, a particular element of $S$. As described above in connection with FIG. 8, $\Gamma$ is a $3 \times m$ matrix whose possible values constitute the output alphabet of the P2PSM, and a particular value of $\Gamma$ is $$\Gamma 0 = \begin{bmatrix} 0 & 0 & ,,, & 0 & \ldots & 0 \\ 0 & 0 & \ldots & 0 & \ldots & 0 \\ 0 & 0 & \ldots & 0 & \ldots & 0 \end{bmatrix}.$$

As discussed above, $\Gamma 0$ signifies that none of the transports of the device are occupied, that there are no connections with other devices, and that no bandwidth is consumed. Define the $3 \times m$ matrix C1 as $$C1 = \begin{bmatrix} 0 & 0 & ,,, & 0 & \ldots & 0 \\ 1 & 0 & \ldots & 0 & \ldots & 0 \\ Ri & 0 & \ldots & 0 & \ldots & 0 \end{bmatrix}$$

Define corresponding $3 \times m$ matrices Cj as $$Cj = \begin{bmatrix} 0 & 0 & ,,, & 0 & \ldots & 0 \\ 0 & 0 & \ldots & 1 & \ldots & 0 \\ 0 & 0 & \ldots & Ri & \ldots & 0 \end{bmatrix}$$

Table 5 provides a specification of $\omega$ in terms of $\Gamma$, C1, and Cj.

TABLE 5

| State | Input | Output |
|---|---|---|
| S | i | $\Gamma + C1$ |
| $S_{ij}$ | FAILURE | $\Gamma$ |
| $S_{ij}$ | SUCCESS | $\Gamma + Cj$ |
| $S_{im}$ | FAILURE | $\Gamma$ |
| S | j-DONE | $\Gamma - Cj$ |

In C1, Ri is the minimum throughput request for sharing content of type i over transport T1. Expression $\Gamma + C1$ can indicate once the sharing of content of type i is successfully started over transport T1, the number of connections over transport T1 will be increased by 1 and the accumulated throughput over transport T1 will be increased by Ri. In Cj, Ri is the minimum throughput request for sharing content of type i over transport Tj. Expression $\Gamma + Cj$ can indicate once the sharing of content of type i is successfully started over transport Tj, the number of connections over transport Tj will be increased by 1 and the accumulated throughput over transport Tj will be increased by Ri. Expression $\Gamma - Cj$ can indicate once the sharing of content of type i is done by failure or success, the number of connections over transport Tj will be decreased by 1 and the accumulated throughput over transport Tj will be decreased by Ri.

Figure 10:
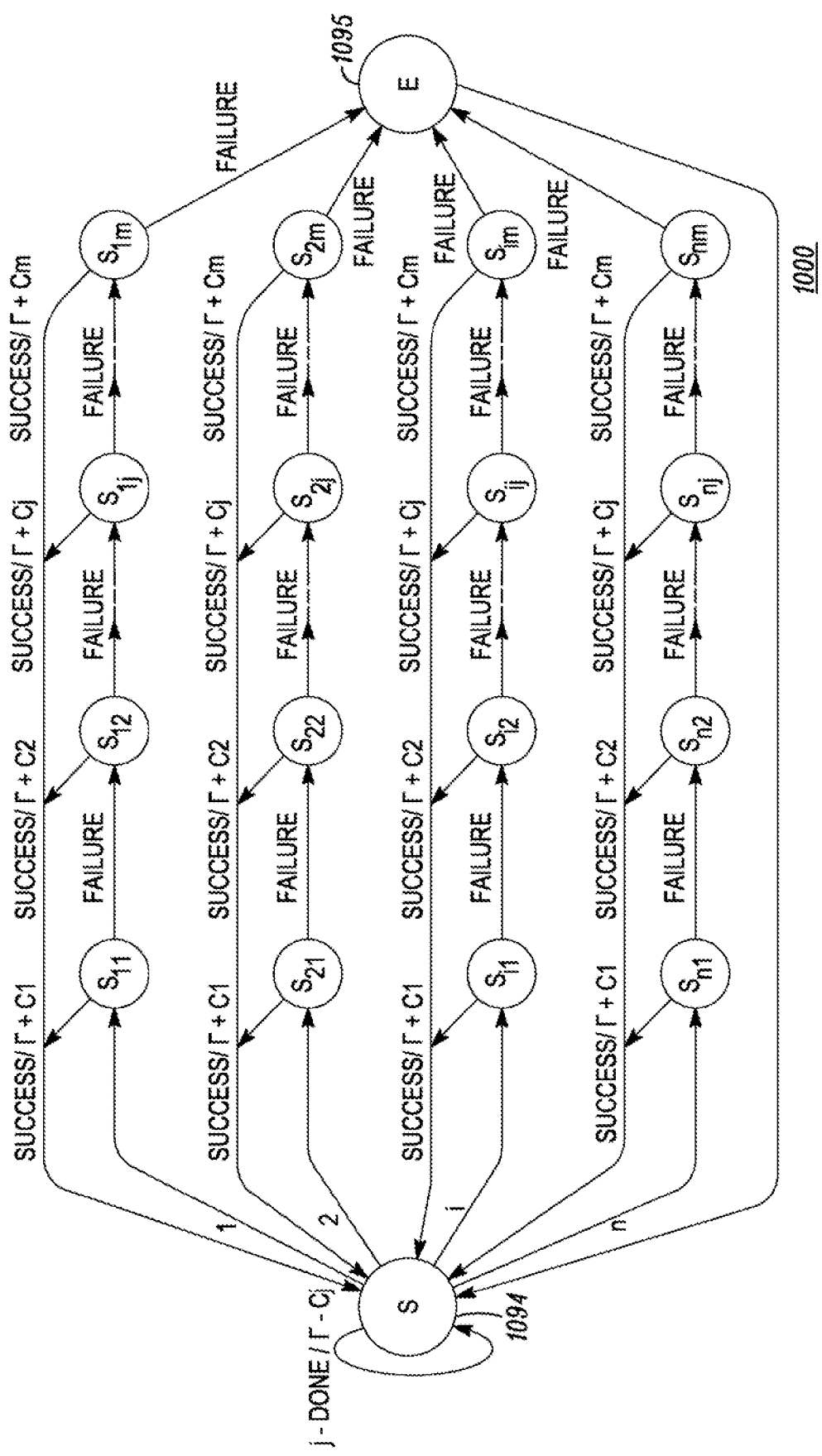
FIG. 10 illustrates an embodiment of a generic example of a P2PSM running on a specific device that may be customized to the media types and transports that the device supports.

FIG. 10 is similar to FIG. 9 and illustrates an embodiment of a generic example of a P2PSM 1000 running on a specific device that may be customized to the media types and transports that the device supports. Details of FIG. 10 may be understood with reference to Tables 4 and 5. Every transition between states is associated with an input/output pair. The input above the slash is the event condition for that transition. The output below the slash is the result of the transition. The output will be stored in the shared memory 138 (see FIG. 1) associated with the synchronization mechanism 118. Outputs lacking changes are not shown in the FIG. 10.

In this generic P2PSM example, there is one Start(S) state 1094, one End(E) state 1095, and $n \times m$ middle states, where m is the number of short-range wireless transports the mobile device has (such as Bluetooth, WiFi, UWB, etc.) and n is the number of application types the mobile device supports (such as image, video, mp3 music, voice call, document editing, etc.) as discussed above The state $S_{ij}$ indicates the device starts to share media using application type i over transport j. The sequence of application types is random. The sequence of the transports is listed by priority for each application type. Transport j has higher priority than transport j+1. For each given application type i, the transport m has the lowest priority.

At the Start state 1094, if two devices are trying to share media of type i, the state machine will transit to the state $S_{i1}$. If sharing fails at state $S_{i1}$, the state machine will transit to the next state (e.g., $S_{i2}$) until the state $S_{ij}$ where sharing of media of type i over transport j starts successfully. Before entering any state $S_{ij}$, the $T_j$ and $P_j$ of Γ will be checked. If Tj equals to 1, which indicates there is no more resources available on transport j, the transport will be skipped. If Tj equals to 0, Pj of F will be further checked. If the remaining bandwidth is not larger than the minimum bandwidth request for sharing media of type i, the transport will be skipped as well.

After the sharing starts successfully, the number of connections over transport j will be increased by 1 and the accumulated throughput over transport j will be increased by Ri. This is done using the expression Γ+Cj. The P2PSM 1000 will return to the start state 1094 on a SUCCESS condition. In the start state 1094, if the sharing successfully finished or fails (j-DONE), the number of connections over transport j will be decreased by 1 and the accumulated throughput over transport j will be decreased by Ri. This is accomplished using the expression Γ−Cj.

Any time the P2PSM enters the start state 1094 because of a SUCCESS (successfully starting sharing over transport j) or j-DONE (finishes or fails sharing over transport j), the number of connections (Lj of Γ) and the corresponding accumulated throughput (Pj of Γ) will be checked. If either Lj reaches the maximum number of connections that transport j can support or Pj reaches 100% (no bandwidth left for further uses), Tj of Γ will be set to 1. Or else Tj of F will be reset to 0.

In the state $S_{ij}$, if sharing fails, the P2PSM 1000 will transition to the state $S_{i(j+1)}$. The failure condition may include the following cases: the transport is busy, the wireless connection has been broken, the device is out of range, and/or there are specific policies that prevent sharing in that state.

If sharing fails on all transports, the P2PSM 1000 will transition to the End state 1095, which will automatically sink to the Start state 1094. The reason for separating the End state 1095 from the Start state 1094 is that it may be necessary to call some special processes at the End state 1095, such as an error handling process. Specific policies for failure conditions can have special requirements for certain types of content or for certain network topologies.

Figure 11:
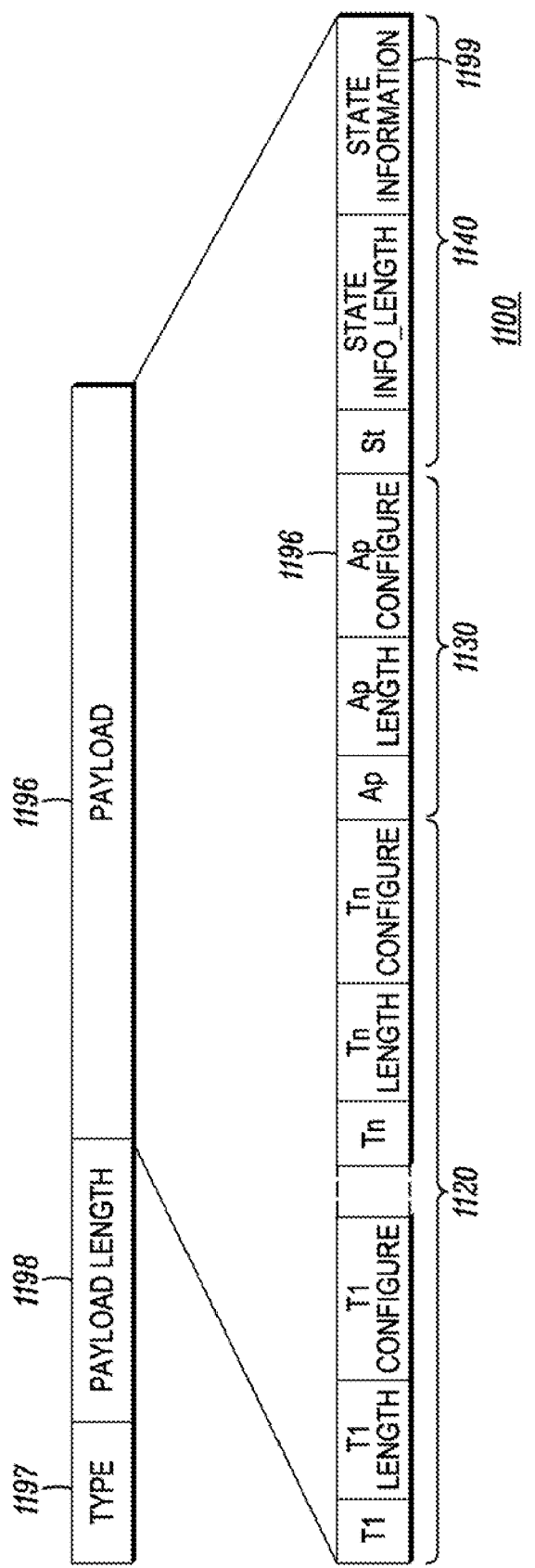
FIG. 11 depicts an example of a generic configuration data format for an NFC-transmitted information exchange between two devices in accordance with an embodiment.

FIG. 11 depicts an example of a generic packet configuration data format 1100 for an NFC-transmitted information exchange between two wireless communication devices. According to the NFC Record Type Definition (RTD) Specification, the NFC-transmitted information data type may be defined as an NFC Forum external type. The payload or type identifier 1197 is "companyname.com:cf" The type "companyname.com:cf" indicates that this is a company specific configuration data type.

Under the RTD specification, the payload length 1198 is an unsigned integer indicating the number of octets in the payload 1196. The payload 1196 has n types of transport configuration records, an application configuration record, and a state record. Every transport configuration record has a transport mean identifier (T1 to Tn), a length, and a payload that contains the configuration details. In this example, a Bluetooth payload 1196 is represented. Referring to FIG. 4, the Bluetooth configuration 450 (see FIG. 4) is represented in FIG. 11 as "T1 configure," T1 indicating (as mentioned in conjunction with FIG. 8) memory records of the output as: T is transport, L is number of links, and P is bandwidth that is associated with the NFC-transmitted information 122, 124, and 126 (see FIG. 1)

In the application configuration record 1130, the type of the application configuration record is "Ap". The application record length is an unsigned integer indicating the number of octets of the application configuration information. The application configuration payload 1196 contains the configuration details (per 426, see FIG. 4).

The type of the state information record is "St". The state info_length is an unsigned integer indicating the number of octets of the state information. The state information record 1199 may include the current state such as, 21 indicates state S21 (see FIG. 9), the minimum bandwidth request Ri to share a certain type of content, the output memory of the synchronization mechanism 118 (see FIG. 1), and other current state related information. For music, the current state related information can be the time index of the music per 426. With the time index of the music, for example, the renderer can jump to that portion of the shared content that the master is currently playing or would like to point out to the user of the renderer device.

Figure 12:
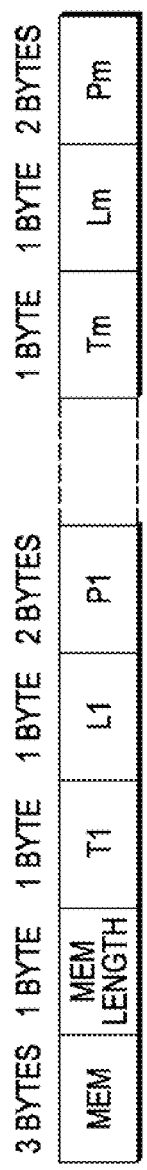
FIG. 12 illustrates the format for the output memory of the state information of FIG. 11.

FIG. 12 illustrates the format for the output memory of the state information 1199 of FIG. 11. As mentioned above, T is transport availability, L is number of links, and P is bandwidth. Referring to FIG. 4, T1 is illustrated as Bluetooth availability 464 (see FIG. 4), L1 is illustrated as Bluetooth connections 465, and P1 is illustrated as bandwidth 466.

Figure 13:
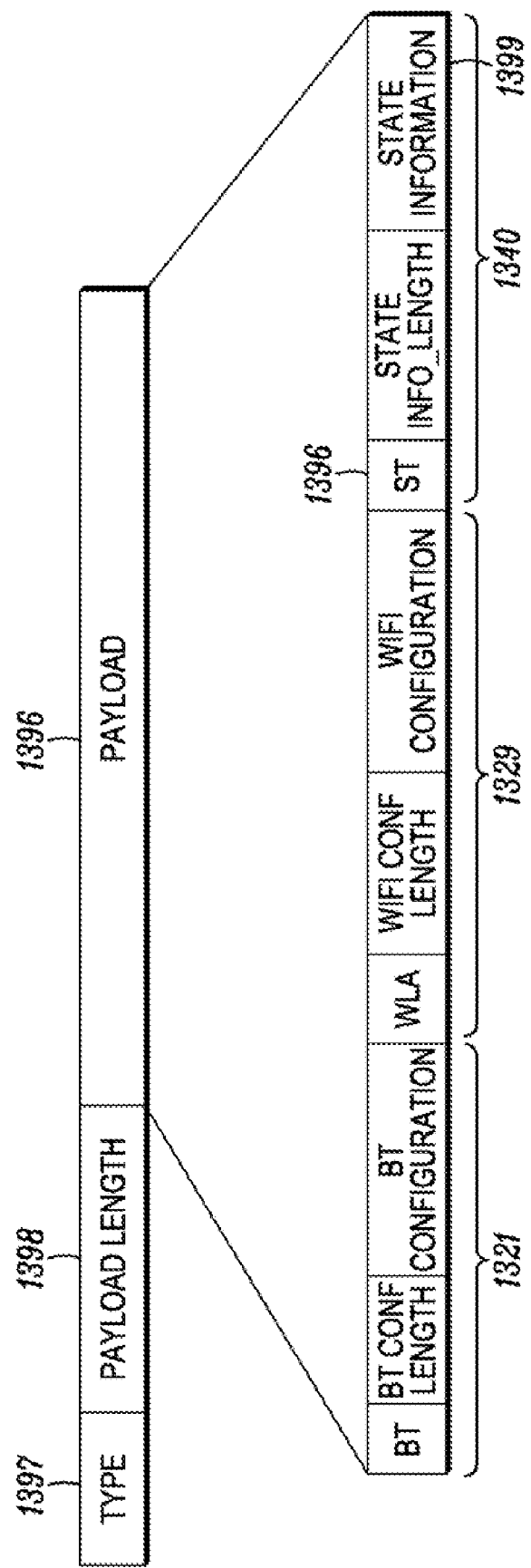
FIG. 13 is a specific example of FIG. 11 with T1=Bluetooth and T2=WiFi.

FIG. 13 is a specific example of FIG. 11 with T1=Bluetooth and T2=WiFi. The state information 1399 in this example is the Bluetooth 463 and WiFi 467 connectivity availability. The type 1397 and payload length 1398 are the same as described above with reference to FIG. 11. The payload 1396 contains the BT configuration record 1321, the WiFi configuration record 1329, and the current state information 1340. It is understood that any variations in the NFC-transmitted information is within the scope of this discussion.

FIG. 14 is a table that specifies the format of the combined "BT," "BT conf length," and "BT configuration" fields 1321 of FIG. 13. The Bluetooth configuration record contains the record type "BT", the length in bytes of the configuration, and the configuration payload. The BT configuration payload can contain, for example, six parameters: a byte indicating the type of configuration data (defines the usage of the BT Authentication Value parameter: discovery only, PIN, or public key), the 6-byte Bluetooth Device address of the sending device, the 3-byte Class of Device, a 16-byte value to be used in creating the PIN for the subsequent Bluetooth connection, a short name length field, and a short name.

FIG. 15 is a table that specifies the format of the combined "Wla," "WiFi conf length," and "WiFi configuration" fields 1329 shown in FIG. 13. The WiFi configuration record contains the record type "Wla", the length in bytes of the configuration, and the configuration payload. The WiFi configuration payload shall contain two mandatory parameters according to: the WLAN standard (such as IEEE Standard 802.11a, 802.11b, 802.11g, or a combination thereof) and the Service Set Identifier (SSID). Several optional parameters may include: a Connection Mode (Infrastructure or Ad-hoc) and RF Channel Id, Encryption type and corresponding keys, and the Ethernet MAC address of the peer.

FIG. 16 is a table that specifies the format for the combined "St," "State info length," and State information" fields 1340 shown in FIG. 13. The type of the state information record is "St". The state info_length is an unsigned integer indicating the number of octets of the state information. It is understood that any variations in the NFC-transmitted information is within the scope of this discussion.

Described are methods and devices for automatically coupling two or more mobile communication devices over a short-range communication link to share content such as calls, music, video, documents, and games where two or more devices automatically determine the feasibility of sharing the content and negotiate to find an efficient manner in which to do so. In this way, the pairing between devices may be transparent to the users. Moreover, a better choice in a transport may be selected without much user input.

Accordingly, while a first user's application is active on a first wireless communication device, at least the first wireless communication device and a second wireless communication device may substantially automatically initiate communication to share the content corresponding to the active application of the first wireless communication device between the first device and second device using a short-range communication link. Each device includes a near field communication (NFC) device that (when in range of the other NFC device) may initiate communication between the wireless communication devices so that the devices may share content. The users of NFC enabled devices may have little or minimal interactions except that one or more users may bring the devices within range (e.g., "tap-to-configure") so that the NFCs may initiate the pairing between the devices. Accordingly, the need for complicated and tedious processes to share content may be eliminated.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, rotating and stationary, and the like are used solely to distinguish one from another entity or action without necessarily requiring or implying any actual such relationship or order between such entities or actions.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A mobile communication device comprising:
   a short-range wireless transceiver configured to transmit data using a wireless transport having a wireless transport configuration indicated by configuration information and also having an available bandwidth;
   a processor configured to run at least one application software program for accessing content indicated by application type information;
   a controller coupled to the short-range wireless transceiver and the processor; and
   a near field communication device coupled to the controller and configured to transmit the configuration information, the available bandwidth, and the application type information and to receive another configuration information, another application type information, and another available bandwidth from another communication device.

2. The device of claim 1 wherein the near field communication device is a radio-frequency identification device.

3. The device of claim 1 further comprising:
   a transceiver configured to communicate over a cellular network.

4. The device of claim 1 wherein the configuration information includes information selected from the group consisting of: a Bluetooth configuration type, a Bluetooth device address, a class of device, a link key, and a device short name.

5. The device of claim 1 wherein the configuration information includes information selected from the group consisting of: a WLAN type, an SSID, a connection mode, an RF Channel ID, an encryption type, and an encryption key.

6. The device of claim 1 wherein the controller is configured to initiate communication via the short-range wireless transceiver when the near field communication device receives and processes the another configuration information indicating the another communication device has a compatible short-range wireless transceiver.

7. The device of claim 1 wherein the application type information comprises a maximum of one application indicator that indicates a highest priority application software program that is running on the processor.

8. The device of claim 7 wherein the application indicator is selected from the group consisting of: a call sharing application indicator, an image viewer application indicator, an audio player application indicator, a document viewer application indicator, and a video player application indicator.

9. The device of claim 1 wherein the application type information comprises a maximum of one content type indicator selected from the group consisting: of a voice content indicator, an image content indicator, an audio content indicator, a video content indicator, and a document content indicator.

10. A method of content sharing between a first wireless communication device and a second wireless communication device, the first wireless communication device configured to execute a first application software program for accessing content having a content type, the method comprising:
   transmitting first short-range wireless transport configuration information, corresponding available bandwidth information and active application information from the first wireless communication device using a first near field communication;
   receiving second short-range wireless transport configuration information, corresponding available bandwidth information, and application availability information from the second wireless communication device using a second near field communication;

establishing a short-range wireless communication link between the first wireless communication device and the second wireless communication device based on the first short-range wireless transport configuration information and corresponding available bandwidth information and the second short-range wireless transport configuration information and corresponding available bandwidth information.

11. The method of claim 10, wherein the transmitting comprises:
transmitting connectivity capability selected from the group consisting of: Bluetooth capability and WiFi capability.

12. The method of claim 10, further comprising:
transmitting content type information using the first near field communication.

13. The method of claim 12, wherein the content type is selected from the group consisting of: a voice content type, an image content type, an audio content type, a video content type, and a document content type.

14. The method of claim 10, further comprising:
transmitting the content from the first wireless communication device to the second wireless communication device using the short-range wireless communication link.

15. The method of claim 14, further comprising:
executing a voice call sharing application software program; and
transmitting voice content from the first wireless communication device to the second wireless communication device over the short-range wireless communication link.

16. The method of claim 10, further comprising:
initiating execution of a second application software program on the second wireless communication device capable of accessing the content;
transmitting the content from the first wireless communication device to the second wireless communication device using the short-range wireless communication link for access by the second application software program.

17. The method of claim 16 further comprising:
implementing in the first wireless communication device a state machine comprising:
an initial state NON in which the first wireless communication device has no short-range wireless connection with the second wireless communication device;
a point-to-point connection state P2P in which the first wireless communication device has one short-range wireless connection with the second wireless communication device;
implementing in the first wireless communication device a peer-to-peer state machine (P2PSM) comprising:
an initial state START in which a successful short-range wireless link configured to share content between the first wireless communication device and the second wireless communication device exists or is not needed;
a final state END in which no successful short-range wireless link configured to share content between the first wireless communication device and the second wireless communication device can be established; and
a plurality of states Sij in which a short-range wireless link of a transport type j configured to share content using content type i between the first wireless communication device and the second wireless communication device has been established;
wherein the state machine tracks short-range wireless transport configuration information, corresponding available bandwidth information, and content type information exchanged via near field communication between the first wireless communication device and the second wireless communication device.

18. The method of claim 16 further comprising:
implementing a point-to-multipoint (P2M) connection in which the first wireless communication device has a point-to-point short-range wireless connection with the second wireless communication device and at least one other point-to-point short-range wireless connection with another wireless communication device.

19. A method of content sharing between a first wireless communication device and a second wireless communication device, the first wireless communication device and the second wireless communication device configured for near field communication via a near field communication device, and the first wireless communication device and the second wireless communication device configured for short-range communication via a plurality of short-range wireless communication transceivers, the first wireless communication device executing an application to output content, the method comprising:
initiating near field communication between the first wireless communication device and the second wireless communication device;
transmitting, via near field communication of the first wireless communication device, configuration information of at least one of the plurality of short-range wireless communication transceivers, available bandwidth, and application type information of the first wireless communication device to the second wireless communication device;
receiving, via near field communication of the second wireless communication device, configuration information of at least one of the plurality of short-range wireless communication transceivers, available bandwidth, and application type information of the second wireless communication device to the first wireless communication device;
negotiating a short-range wireless link selected from the plurality of short-range wireless communication transceivers of the first wireless communication device and the second wireless communication device, negotiation of the short-range wireless link between the first wireless communication device and the second wireless communication device based on available bandwidth of the first wireless communication device and the second wireless communication device and the application type information of the first wireless communication device and the second wireless communication device to determine a negotiated short-range wireless link;
initiating the negotiated short-range wireless link for transmitting the output content from the first wireless communication device to the second wireless communication device; and
ending the near field communication between the first wireless communication device and the second wireless communication device.

20. The method of claim 19, wherein the output content comprises at least one of:
a voice call, an image, music, a document, and a video; and the application respectively comprises at least one of:
voice call sharing application, an image viewer, a music player, a word processor, and a video player.

* * * * *